US012102871B2

(12) United States Patent
Sugao et al.

(10) Patent No.: US 12,102,871 B2
(45) Date of Patent: Oct. 1, 2024

(54) INSTRUMENT AND TRAINING METHOD

(71) Applicant: LEMON inc., Tokyo (JP)

(72) Inventors: Hisayo Sugao, Tokyo (JP); Shinjiro Yamada, Tokyo (JP)

(73) Assignee: LEMON inc., Tokyo (JP)

( * ) Notice: Subject to any disclaimer, the term of this patent is extended or adjusted under 35 U.S.C. 154(b) by 44 days.

(21) Appl. No.: 18/257,253

(22) PCT Filed: Dec. 3, 2021

(86) PCT No.: PCT/JP2021/044544
§ 371 (c)(1),
(2) Date: Jun. 13, 2023

(87) PCT Pub. No.: WO2022/131031
PCT Pub. Date: Jun. 23, 2022

(65) Prior Publication Data

US 2024/0033567 A1 Feb. 1, 2024

(30) Foreign Application Priority Data

Dec. 14, 2020 (JP) ................................ 2020-207094

(51) Int. Cl.
*A63B 23/16* (2006.01)
*A61H 1/02* (2006.01)
(Continued)

(52) U.S. Cl.
CPC ........... *A63B 23/16* (2013.01); *A61H 1/0288* (2013.01); *A61H 7/001* (2013.01); *A63B 21/4019* (2015.10)

(58) Field of Classification Search
CPC ...... A61H 1/0288; A61H 7/001; A63B 23/16; A63B 21/4019
See application file for complete search history.

(56) References Cited

U.S. PATENT DOCUMENTS 4,590,625 A 5/1986 Keim
4,882,787 A 11/1989 Hull
(Continued)

FOREIGN PATENT DOCUMENTS

JP 3-184571 A 8/1991
JP H10-137320 A 5/1998
(Continued)

OTHER PUBLICATIONS

Shoichi Ishiura, "Motion and Body Illustration; Mechanism of Brain and Nerves", Mynavi Publishing Corporation, Mar. 29, 2016, p. 45-46 [This Non-English non patent literature has been cited on p. 5 of the specification, and therefore it is believed that a concise explanation of relevancy has been provided].
(Continued)

*Primary Examiner* — Megan Anderson
(74) *Attorney, Agent, or Firm* — Muncy, Geissler, Olds & Lowe, P.C.

(57) ABSTRACT

Provided is an instrument and a training method capable of promoting muscle stretching and increasing a range of motion of a joint. An instrument according to the present invention is an instrument for reducing muscle pain during muscle stretching and increasing a range of motion of a joint, including: a main body portion; and a pressing portion that is provided to protrude from the main body portion and presses to stimulate a Pacinian corpuscle present in a palm of a user, in which by grasping the main body portion with one hand, the pressing portion accurately contacts the Pacinian corpuscle, and an appropriate pressure can be applied to the Pacinian corpuscle.

13 Claims, 28 Drawing Sheets

(51) Int. Cl.
*A61H 7/00* (2006.01)
*A63B 21/00* (2006.01)

(56) References Cited

U.S. PATENT DOCUMENTS

| | | | | |
|---|---|---|---|---|
| 5,299,991 | A | 4/1994 | Sato | |
| 10,500,744 | B1 | 12/2019 | Dryfhout | |
| 2018/0236337 | A1 * | 8/2018 | Frith, Jr. | A63B 21/0552 |
| 2019/0199069 | A1 | 6/2019 | Johnson | |
| 2020/0356169 | A1 | 11/2020 | Belomoev | |

FOREIGN PATENT DOCUMENTS

| | | | |
|---|---|---|---|
| JP | 11-42296 | A | 2/1999 |
| JP | 11-299926 | A | 11/1999 |
| JP | 3078881 | U | 7/2001 |
| JP | 2002-263215 | A | 9/2002 |
| JP | 2007-268056 | A | 10/2007 |
| JP | 2010-88810 | A | 4/2010 |
| JP | 2016-182272 | A | 10/2016 |
| JP | 2017-35450 | A | 2/2017 |
| JP | 2018-10582 | A | 1/2018 |
| JP | 2020-528628 | A | 9/2020 |
| WO | 2010/033055 | A1 | 3/2010 |

OTHER PUBLICATIONS

Seiji Ozawa and Koichiro Fukuda, "Standard physiology", Igaku-Shoin Ltd., Apr. 1, 2009, p. 221-223 [This Non-English non patent literature has been cited on p. 5 of the specification, and therefore it is believed that a concise explanation of relevancy has been provided].

Johansson RS, Vallbo AB, Tactile sensory coding in the glabrous skin of the human hand,. Jan. 1983, Trends Neurosci 6: 27-31.

Hie-Yong Jeong, Makoto Kaneko, Mitsuru Higashimori, and Kanji Matsukawa, "Improvement of Tactile Sensitivity under Pressing a Finger Base", Transactions of the Society of Instrument and Control Engineers, vol. 43, No. 11, p. 973-979, 2007.

Yuki Mori, Takayuki Tanaka, Shun'ichi Kaneko, "Design of Vibration Alert Interface based on Vibration Strength Considering Skin Deformation with Respect to Grip Force", The transaction of Human Interface Society, vol. 12, No. 2, pp. 103-111, 2010.

International Preliminary Report on Patentability of the corresponding WIPO application No. PCT/JP2021/044544 dated Jun. 13, 2023, which includes English translation of Written Opinion of the International Searching Authority of PCT/JP2021/044544 dated Dec. 28, 2021.

* cited by examiner

Fig. 7
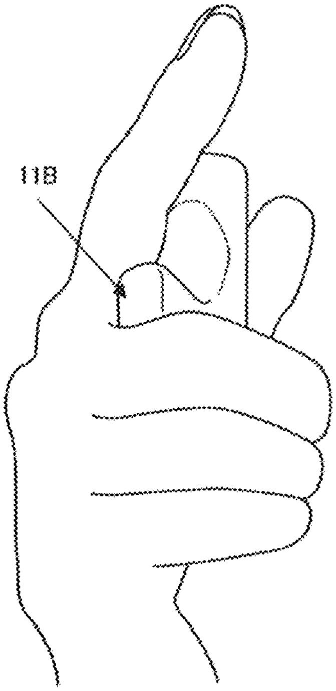
(c)
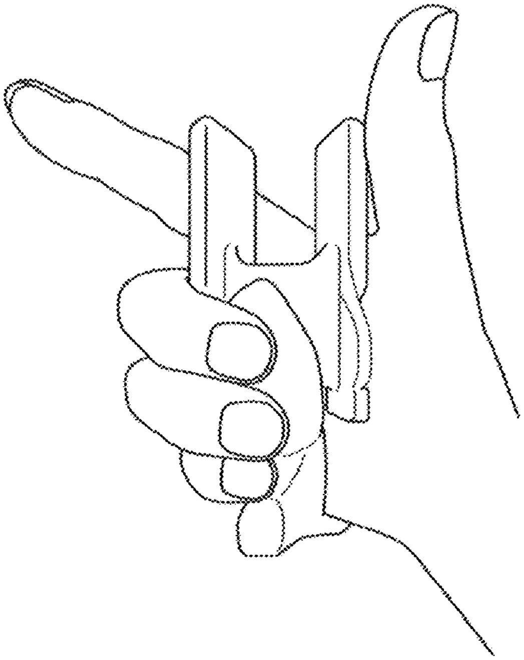
(d)
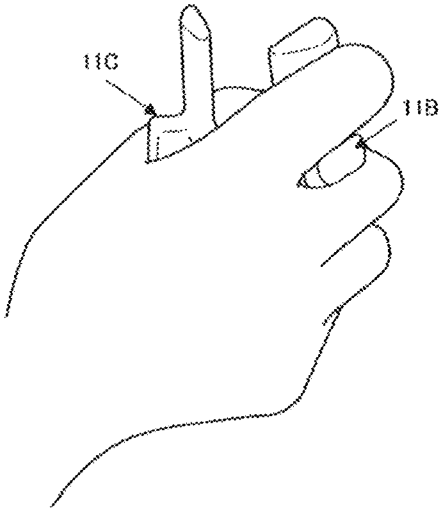
(e)

*Fig.8*
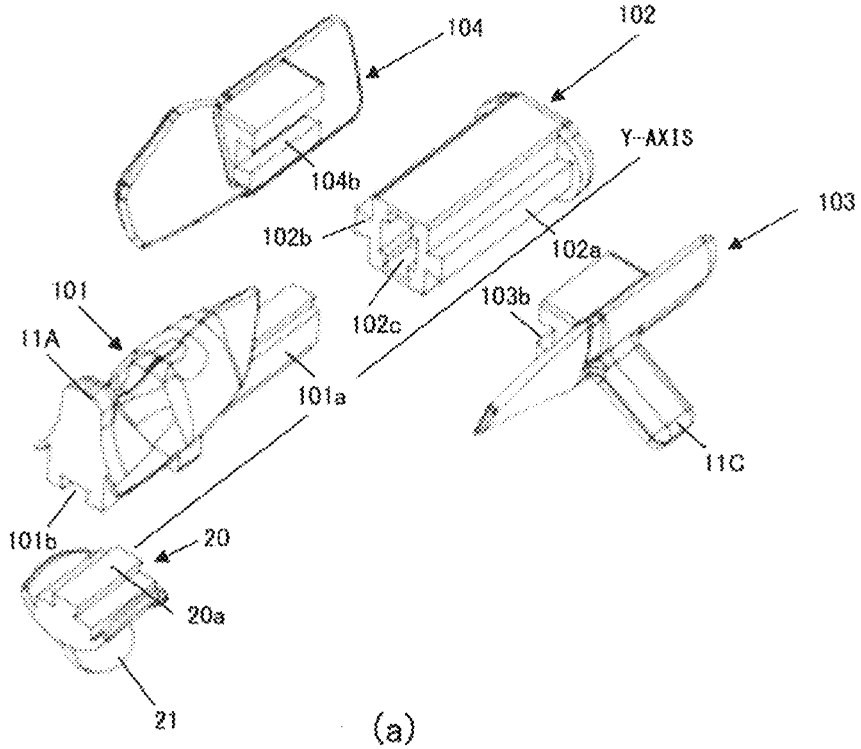
(a)
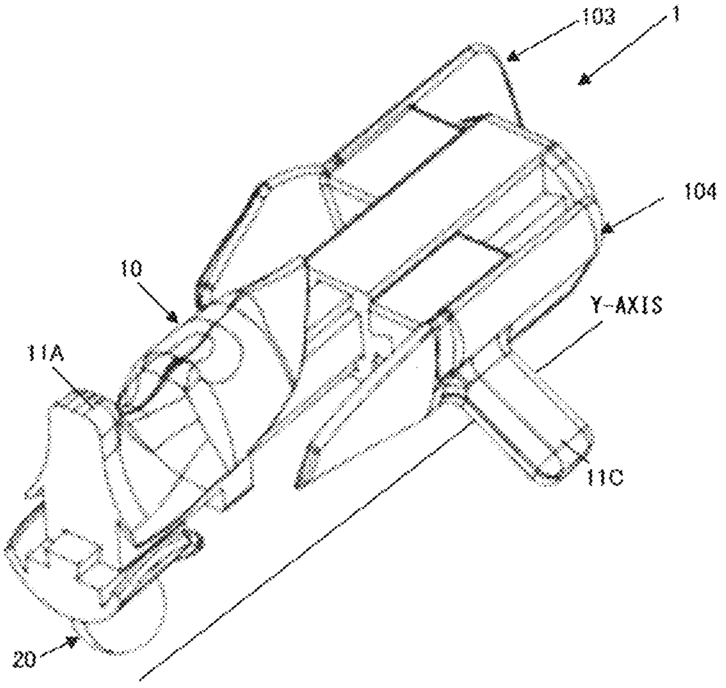
(b)

*Fig.13*
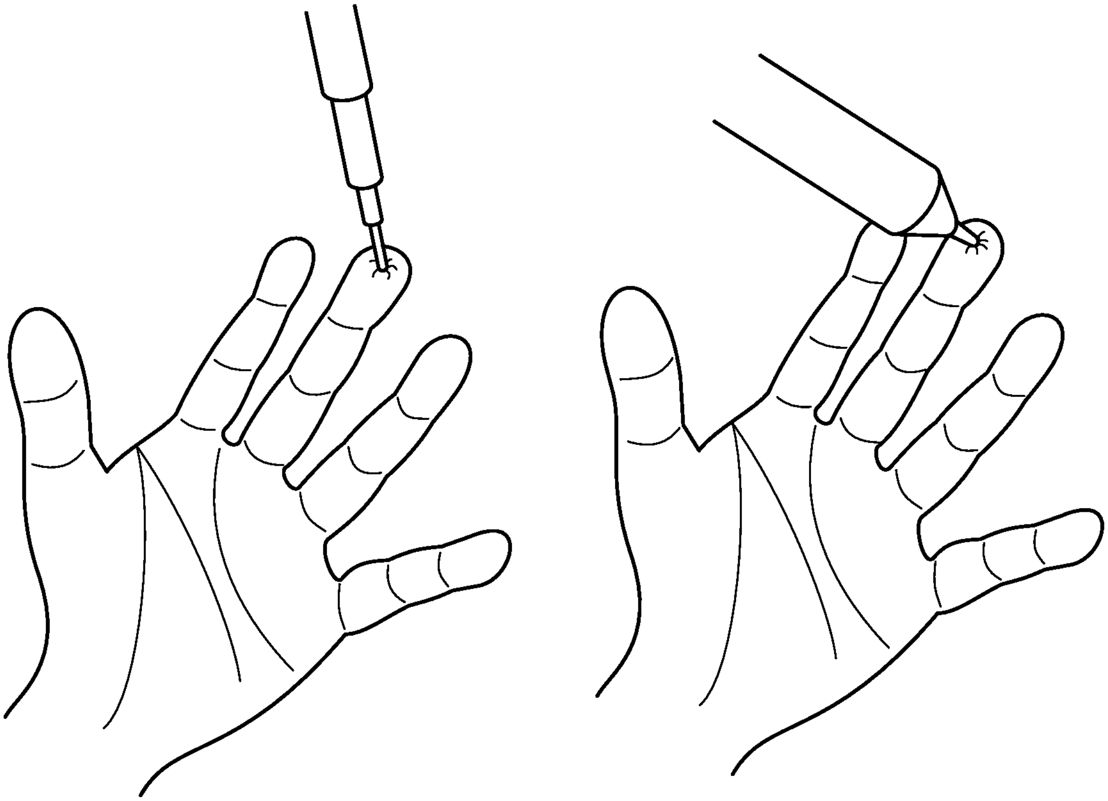
(a)
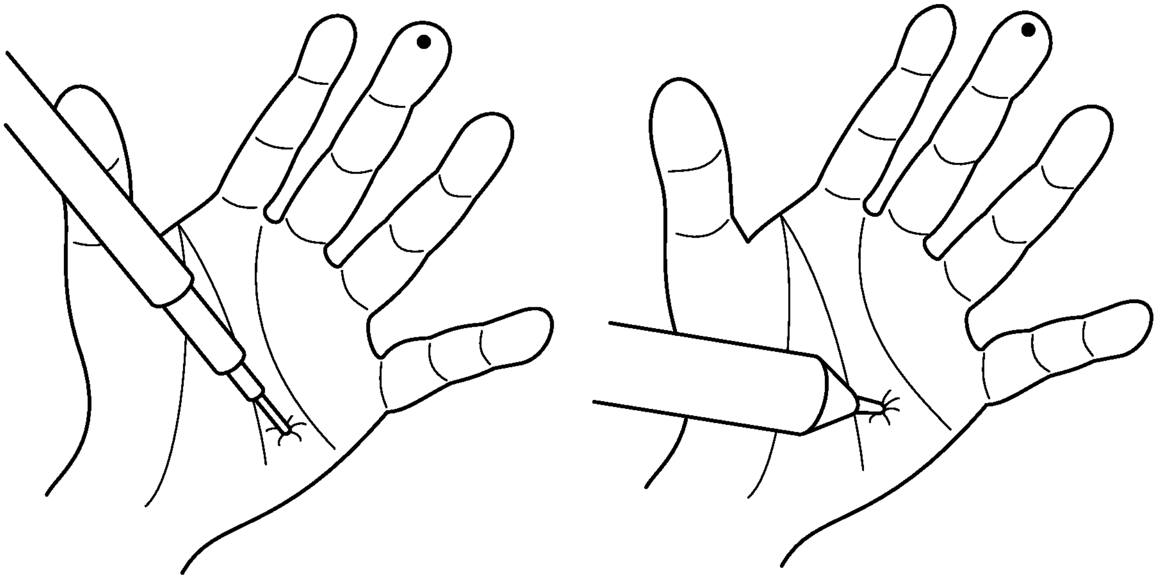
(b)

LATERAL BENDING (LEFT)
SUBJECT #4
FEMALE
34 YEARS OLD

DOTTED LINE : EMPTY HAND
SOLID LINE : GRIP

Fig.24
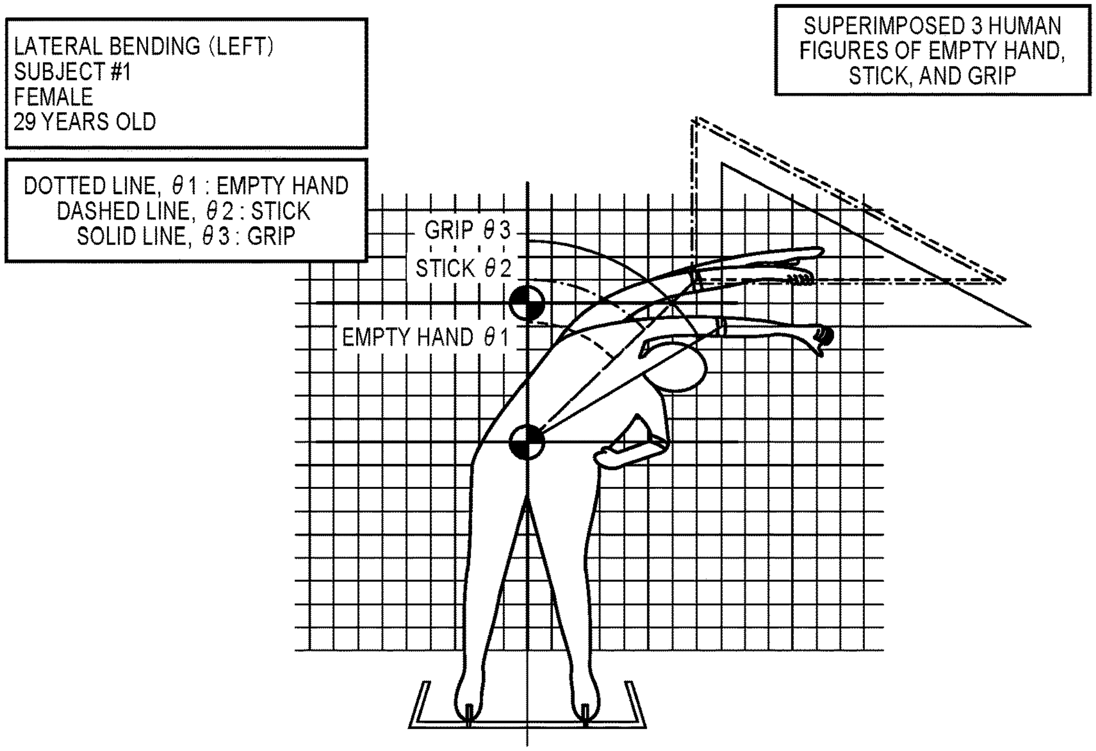
(a)
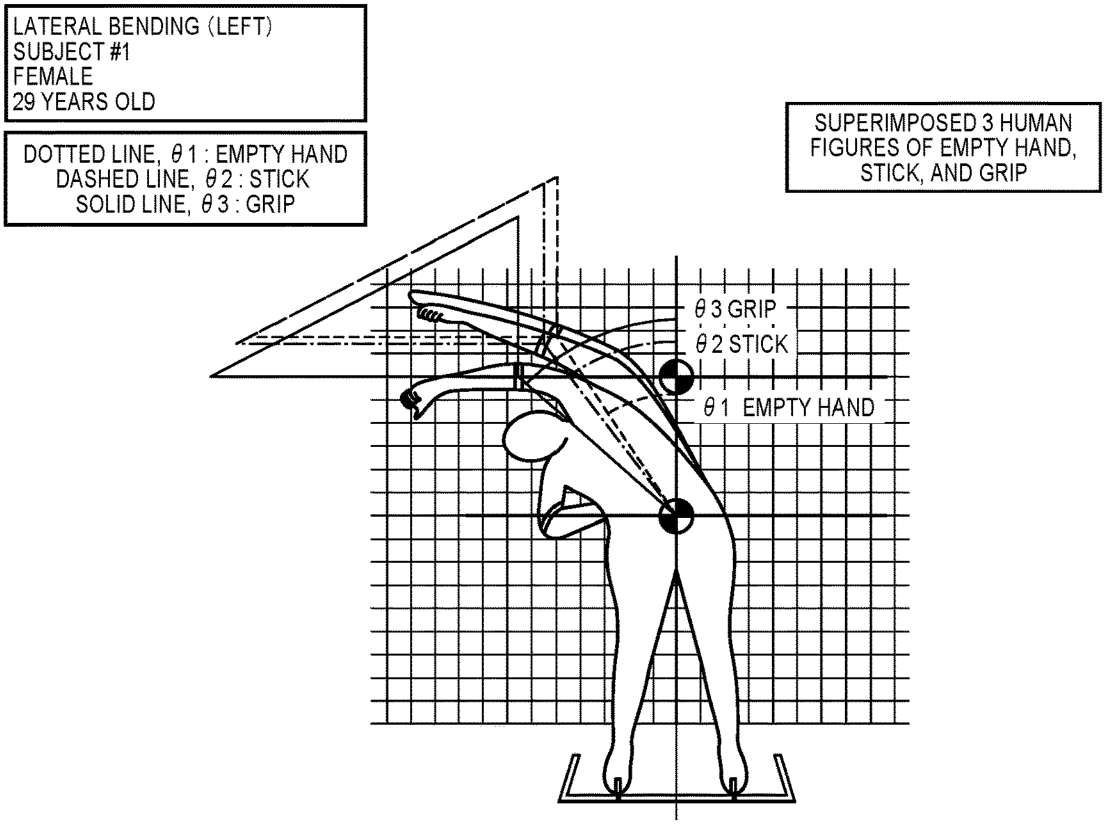
(b)

Fig.25
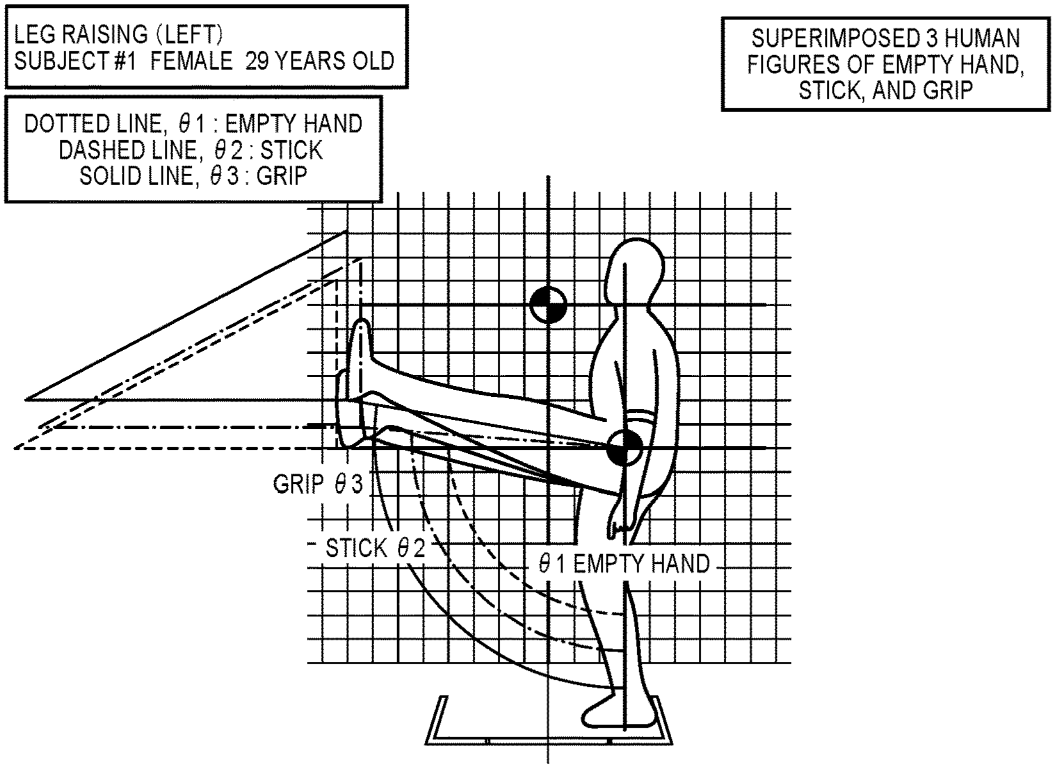
(a)
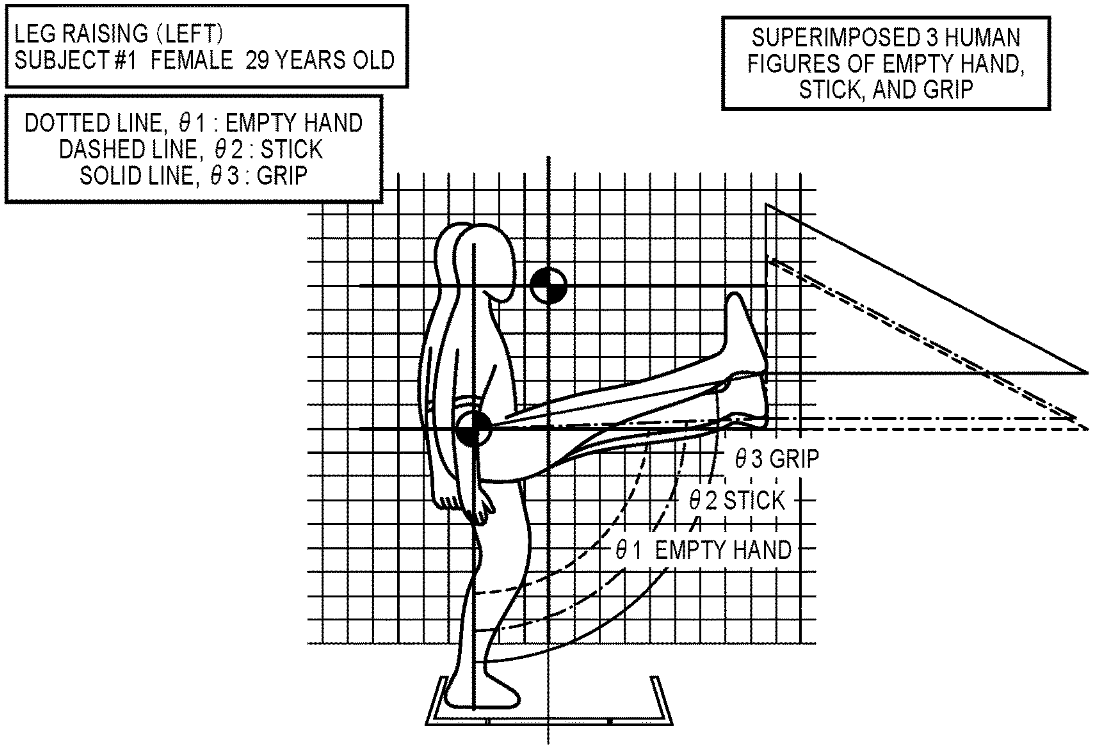
(b)

*Fig.26*
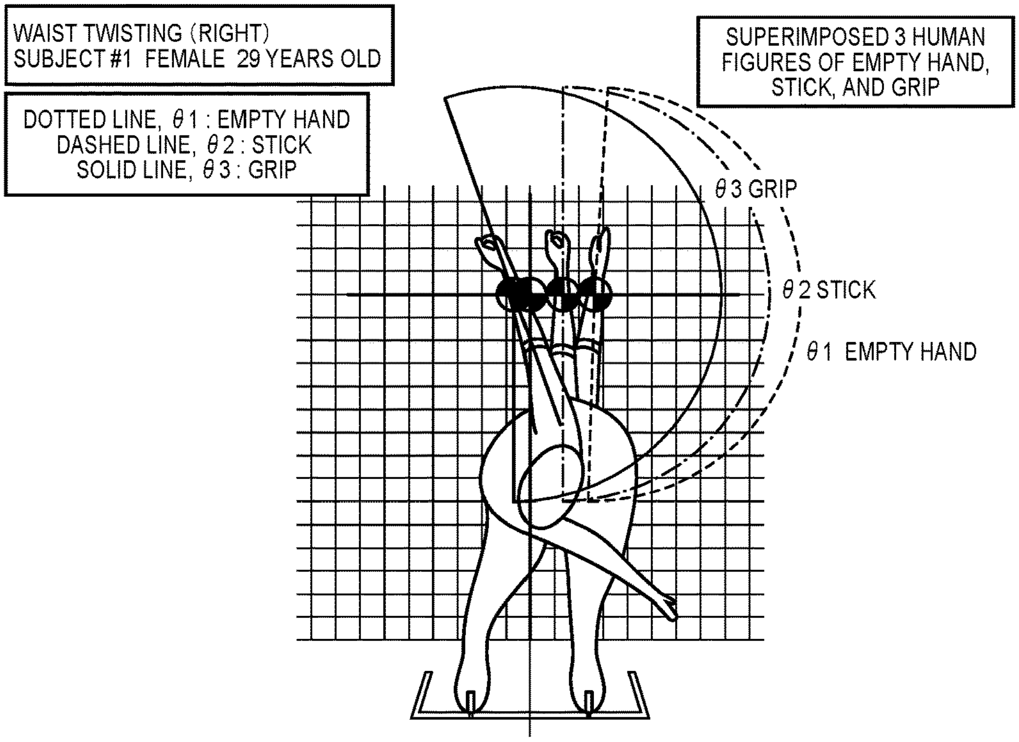
(a)
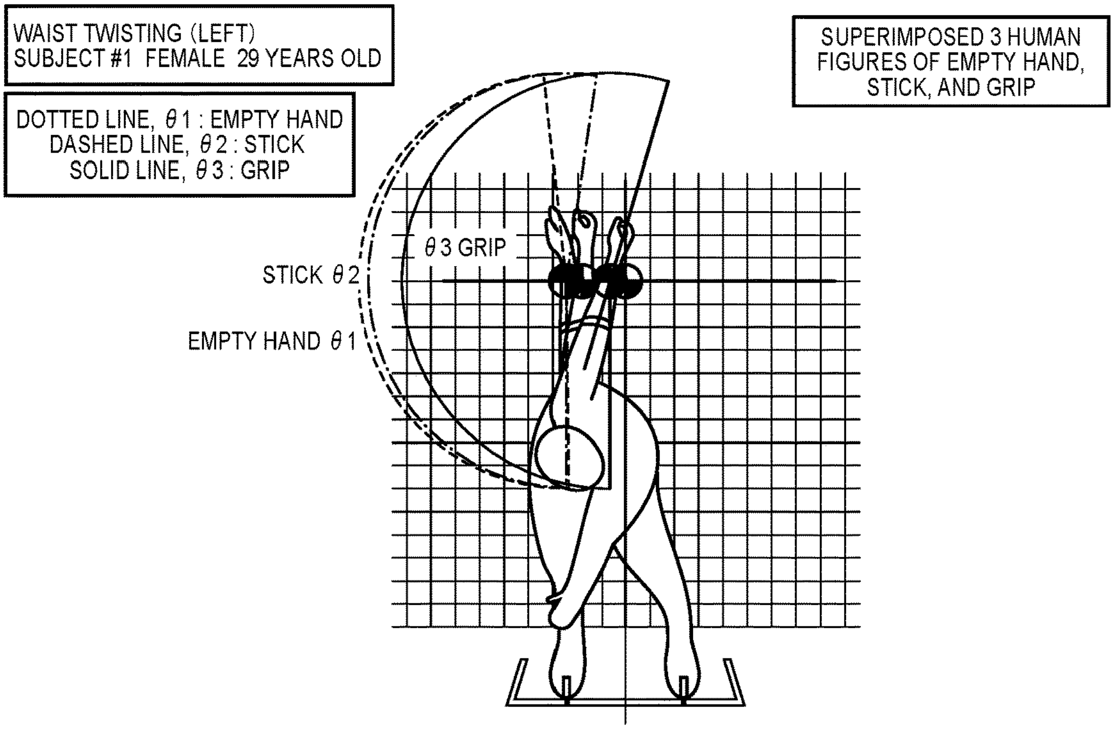
(b)

Fig. 27

ANGLE COMPARISON TABLE OF EMPTY HAND AND GRIP

※ $\Delta\theta 1 = \theta 3(\text{GRIP}) - \theta 1(\text{EMPTY HAND})$

| | ATTRIBUTE | | LATERAL BENDING LEFT | | | LATERAL BENDING RIGHT | | | LEG RAISING LEFT | | | LEG RAISING RIGHT | | | WAIST TWISTING LEFT | | | WAIST TWISTING RIGHT | | |
|---|---|---|---|---|---|---|---|---|---|---|---|---|---|---|---|---|---|---|---|---|
| SUBJECT NUMBER | AGE | SEX | θ1 (EMPTY HAND) | θ3 (GRIP) | Δθ1 | θ1 (EMPTY HAND) | θ3 (GRIP) | Δθ1 | θ1 (EMPTY HAND) | θ3 (GRIP) | Δθ1 | θ1 (EMPTY HAND) | θ3 (GRIP) | Δθ1 | θ1 (EMPTY HAND) | θ3 (GRIP) | Δθ1 | θ1 (EMPTY HAND) | θ3 (GRIP) | Δθ1 |
| 1 | 29 YEARS OLD | FEMALE | 44.5 | 56.5 | 12 | 31.5 | 46.5 | 15 | 93 | 99 | 6 | 91 | 102 | 11 | 176 | 200 | 24 | 173 | 196 | 23 |
| 2 | 34 YEARS OLD | FEMALE | 37 | 44.5 | 7.5 | 34.5 | 40 | 5.5 | 105 | 113 | 8 | 110.5 | 118 | 7.5 | 158 | 194 | 35 | 177 | 200 | 23 |
| 3 | 36 YEARS OLD | MALE | 39.5 | 50 | 10.5 | 40 | 50 | 10 | 86.5 | 94 | 7.5 | 88 | 94 | 6 | 189 | 202 | 13 | 183 | 202 | 19 |
| 4 | 39 YEARS OLD | MALE | 22 | 34 | 12 | 21.5 | 30 | 8.5 | 85.5 | 87 | 1.5 | 84 | 90 | 6 | 180 | 187 | 7 | 148 | 168 | 20 |
| 5 | 41 YEARS OLD | MALE | 34 | 40 | 6 | 25 | 28 | 3 | 110 | 120 | 10 | 111.5 | 113 | 1.5 | 182 | 193 | 11 | 169 | 182 | 13 |
| 6 | 41 YEARS OLD | FEMALE | 30.5 | 36 | 5.5 | 28 | 42 | 14 | 106 | 112 | 6 | 105.5 | 111.5 | 6 | 204 | 218 | 14 | 201 | 208 | 8 |
| 7 | 42 YEARS OLD | FEMALE | 22.5 | 33.5 | 11 | 19 | 26.5 | 7.5 | 99 | 105 | 6 | 103.5 | 110 | 6.5 | 190 | 209 | 19 | 210 | 207 | -3 |
| 8 | 70 YEARS OLD | FEMALE | 35 | 46.5 | 11.5 | 25.5 | 35 | 9.5 | 103.5 | 110 | 6.5 | 101.5 | 102.5 | 1 | 190 | 195 | 5 | 192 | 204 | 12 |

*Fig.28*

ANGLE COMPARISON TABLE OF STICK AND GRIP

※$\Delta\theta 2 = \theta 3(\text{GRIP}) - \theta 2(\text{STICK})$

| | ATTRIBUTE | | LATERAL BENDING LEFT | | | LATERAL BENDING RIGHT | | | LEG RAISING LEFT | | | LEG RAISING RIGHT | | | WAIST TWISTING LEFT | | | WAIST TWISTING RIGHT | | |
|---|---|---|---|---|---|---|---|---|---|---|---|---|---|---|---|---|---|---|---|---|
| SUBJECT NUMBER | AGE | SEX | $\theta 2$(STICK) | $\theta 3$(Grip) | $\Delta\theta 2$ | $\theta 2$(STICK) | $\theta 3$(Grip) | $\Delta\theta 2$ | $\theta 2$(STICK) | $\theta 3$(Grip) | $\Delta\theta 2$ | $\theta 2$(STICK) | $\theta 3$(Grip) | $\Delta\theta 2$ | $\theta 2$(STICK) | $\theta 3$(Grip) | $\Delta\theta 2$ | $\theta 2$(STICK) | $\theta 3$(Grip) | $\Delta\theta 2$ |
| 1 | 29 YEARS OLD | FEMALE | 44 | 56.5 | 12.5 | 35 | 46.5 | 11.5 | 89.5 | 99 | 9.5 | 93.5 | 102 | 8.5 | 182 | 200 | 18 | 185 | 196 | 11 |
| 2 | 34 YEARS OLD | FEMALE | 40 | 44.5 | 4.5 | 35.5 | 40 | 4.5 | 106.5 | 113 | 6.5 | 115 | 118 | 3 | 173 | 194 | 21 | 188 | 200 | 12 |
| 3 | 36 YEARS OLD | MALE | 41.5 | 50 | 8.5 | 37.5 | 50 | 12.5 | 86 | 94 | 8 | 87.5 | 94 | 6.5 | 181 | 202 | 21 | 192 | 202 | 10 |
| 4 | 39 YEARS OLD | MALE | 23 | 34 | 11 | 26 | 30 | 4 | 85 | 87 | 2 | 87 | 90 | 3 | 168 | 187 | 19 | 168 | 168 | 0 |
| 6 | 41 YEARS OLD | MALE | 34 | 40 | 6 | 25.5 | 28 | 2.5 | 112.5 | 120 | 7.5 | 112.5 | 113 | 0.5 | 181 | 193 | 12 | 172 | 182 | 10 |
| 7 | 41 YEARS OLD | FEMALE | 26 | 36 | 10 | 33.5 | 42 | 8.5 | 106 | 112 | 6 | | 111.5 | | 210 | 218 | 8 | 206 | 209 | 3 |
| 5 | 42 YEARS OLD | FEMALE | 26.5 | 33.5 | 7 | 22 | 26.5 | 4.5 | 105 | 105 | 0 | 103 | 110 | 7 | 197 | 209 | 12 | 205 | 207 | 2 |
| 8 | 70 YEARS OLD | FEMALE | 38.5 | 46.5 | 8 | 28 | 35 | 7 | 106.5 | 110 | 3.5 | 102 | 102.5 | 0.5 | 186 | 195 | 9 | 199 | 204 | 5 |

*Fig.29*

ANGLE COMPARISON TABLE OF EMPTY HAND AND STICK

※ $\Delta\theta 3 = \theta 2$(STICK) − $\theta 1$(EMPTY HAND)

| | ATTRIBUTE | | LATERAL BENDING LEFT | | | LATERAL BENDING RIGHT | | | LEG RAISING LEFT | | | LEG RAISING RIGHT | | | WAIST TWISTING LEFT | | | WAIST TWISTING RIGHT | | |
|---|---|---|---|---|---|---|---|---|---|---|---|---|---|---|---|---|---|---|---|---|
| SUBJECT NUMBER | AGE | SEX | $\theta 1$(EMPTY HAND) | $\theta 2$(STICK) | $\Delta\theta 3$ | $\theta 1$(EMPTY HAND) | $\theta 2$(STICK) | $\Delta\theta 3$ | $\theta 1$(EMPTY HAND) | $\theta 2$(STICK) | $\Delta\theta 3$ | $\theta 1$(EMPTY HAND) | $\theta 2$(STICK) | $\Delta\theta 3$ | $\theta 1$(EMPTY HAND) | $\theta 2$(STICK) | $\Delta\theta 3$ | $\theta 1$(EMPTY HAND) | $\theta 2$(STICK) | $\Delta\theta 3$ |
| 1 | 29 YEARS OLD | FEMALE | 44.5 | 44 | -0.5 | 31.5 | 35 | 3.5 | 93 | 89.5 | -3.5 | 91 | 93.5 | 2.5 | 176 | 182 | 6 | 173 | 185 | 12 |
| 2 | 34 YEARS OLD | FEMALE | 37 | 40 | 3 | 34.5 | 35.5 | 1 | 105 | 106.5 | 1.5 | 110.5 | 115 | 4.5 | 159 | 173 | 14 | 177 | 188 | 11 |
| 3 | 36 YEARS OLD | MALE | 39.5 | 41.5 | 2 | 40 | 37.5 | -2.5 | 86.5 | 86 | -0.5 | 88 | 87.5 | -0.5 | 189 | 181 | -8 | 183 | 192 | 9 |
| 4 | 39 YEARS OLD | MALE | 22 | 23 | 1 | 21.5 | 26 | 4.5 | 85.5 | 85 | -0.5 | 84 | 87 | 3 | 180 | 168 | -12 | 148 | 168 | 20 |
| 5 | 41 YEARS OLD | MALE | 34 | 34 | 0 | 25 | 25.5 | 0.5 | 110 | 112.5 | 2.5 | 111.5 | 112.5 | 1 | 182 | 181 | -1 | 169 | 172 | 3 |
| 6 | 41 YEARS OLD | FEMALE | 30.5 | 26 | -4.5 | 28 | 33.5 | 5.5 | 106 | 106 | 0 | 105.5 | | | 204 | 210 | 6 | 201 | 206 | 5 |
| 7 | 42 YEARS OLD | FEMALE | 22.5 | 26.5 | 4 | 19 | 22 | 3 | 99 | 105 | 6 | 103.5 | 103 | -0.5 | 190 | 197 | 7 | 210 | 205 | -5 |
| 8 | 70 YEARS OLD | FEMALE | 35 | 38.5 | 3.5 | 25.5 | 28 | 2.5 | 103.5 | 106.5 | 3 | 101.5 | 102 | 0.5 | 190 | 186 | -4 | 192 | 199 | 7 |

INSTRUMENT AND TRAINING METHOD

TECHNICAL FIELD

The present invention relates to an instrument and a training method for increasing a range of motion of a joint.

BACKGROUND ART

With aging, joint flexibility is lost and a body becomes stiff, but loss of flexibility may cause unexpected disorders. In particular, in the case of an elderly person, it has also been reported that when a leg is broken at the time of tumbling or falling, the person tends to be bedridden, and when the person is bedridden, dementia progresses. In addition, even if the person is not an elderly person, an unexpected serious accident is caused due to low flexibility. In addition, there is a risk of causing unforeseen disorders such as Achilles tendon rupture and muscle damage during sports. High flexibility prevents such unforeseen accidents, injuries, and disorders. This flexibility is one of human physical strengths, is an ability to stretch muscles and tendons, is one of motion ability together with muscle strength, instantaneous force, endurance, and adjustment force, and is a physical ability that is a basis of basic actions. In other words, the high flexibility means that the range of motion of the joint increases, and flexible movement is realized. In order to maintain and promote health and to perform activities with security in the 100 year life, it is one of very important approaches to increase and maintain the flexibility, which is a force to smoothly perform an action of a constituent of physical strength as the physical ability that is the basis of basic actions.

For example, in order to improve the flexibility, Patent Literature 1 proposes a stretching auxiliary instrument including a footboard, a heel stopper protruding from an upper portion of a rear end portion of the footboard, and a support member that supports the footboard while inclining the footboard at a desired angle, in which a desired number of engagement recessed grooves for angle adjustment in a width direction of the footboard are formed in parallel on an upper surface of the footboard at a predetermined interval in a front-back direction of the footboard, and the support member includes a pair of leg rods having a predetermined length that are placed parallel to each other with a distance slightly longer than a width of the footboard, a connecting rod that connects and fixes both leg rods, an engaging rod that is located on a straight line connecting both leg rods and formed in a perpendicular direction at an upper end of both leg rods and engages with the recessed groove, and a support rod that is located below the engaging rod and is horizontally bridged and fixed between both leg rods with a distance interval corresponding to a thickness of the footboard between the support rod and the engaging rod.

Then, according to the stretching auxiliary instrument, when the footboard is inserted between the engaging rod and the support rod of the support member from a tip side to engage the engaging rod with the engagement recessed groove, and the footboard is grounded by opening the leg rod forwardly of the footboard in that state, the footboard is supported by the support rod, fixed by wedge action with the engaging rod, and stably supported in an inclined state. Therefore, by standing on the footboard and using the footboard in the same way as before, it is said that it exhibits various excellent effects of stretching such as strengthening of the Achilles tendon.

CITATION LIST

Patent Literature

Patent Literature 1: JP 11-299926 A

SUMMARY OF INVENTION

Technical Problem

However, the conventional method for increasing the range of motion of the joint uses a large-scale apparatus or is accompanied with muscle pain or suffering during muscle stretching, and thus there is a problem that it is difficult to perform the method easily and continuously. In addition, there is a problem that the flexibility returns to an original state unless stretching is performed for a while. As described above, the conventional method for increasing the range of motion of the joint has little or no effect. Therefore, a more effective method is desired.

The present invention has been made in view of the above problems, and an object of the present invention is to provide an instrument and a training method capable of promoting muscle stretching and increasing the range of motion of the joint.

Solution to Problem

In order to solve the above problems, the present inventors have found that when a specific Pacinian corpuscle (specifically, a Pacinian corpuscle present in a palm) among a large number of Pacinian corpuscles present in a human body is pressed, the muscle stretching is promoted, and the range of motion of the joint can be increased by reducing the muscle pain, and completed the present invention.

Advantageous Effects of Invention

According to the present invention, it is possible to provide an instrument and a training method capable of promoting muscle stretching and increasing the range of motion of the joint. Moreover, according to the present invention, when the instrument is used, an effect of maintaining a muscle stretching effect for a certain period of time (for example, 5 minutes) after use is also exhibited.

BRIEF DESCRIPTION OF DRAWINGS

FIG. 7 is a view illustrating the method of grasping the instrument according to the embodiment.

FIG. 8 is a view illustrating a configuration of the instrument according to a modification of the embodiment.

FIG. 13 is a view for explaining the measurement in Example.

FIG. 24 is a view for explaining the measurement in Example.

FIG. 25 is a view for explaining the measurement in Example.

FIG. 26 is a view for explaining the measurement in Example.

FIG. 27 is a diagram showing measurement results (empty hand and instrument (grip)) of Example.

FIG. 28 is a diagram showing measurement results (stick and instrument (grip)) of Example.

FIG. 29 is a diagram showing measurement results (empty hand and stick) of Example.

DESCRIPTION OF EMBODIMENTS

Hereinafter, an embodiment of the present invention will be described with reference to the drawings.

Positions of the Pacinian corpuscles on palms of a human body are almost the same, but the positions are slightly different depending on a person and left and right hands.

An instrument according to the embodiment has a structure in which, in a hand tool held in one hand and used, when gripped in the palm, a Pacinian ball (a contact portion 21 of a pressing portion 20), which is a protrusion provided in a main body, hits an accurate position of the Pacinian corpuscle every time. In addition, the instrument according to the embodiment is characterized in that a force or a pressure can be adjusted so that an appropriate pressure capable of maximally exhibiting an effect (muscle relaxation effect) of the Pacinian corpuscle is applied.

(Pacinian Corpuscle)

Figure 30:
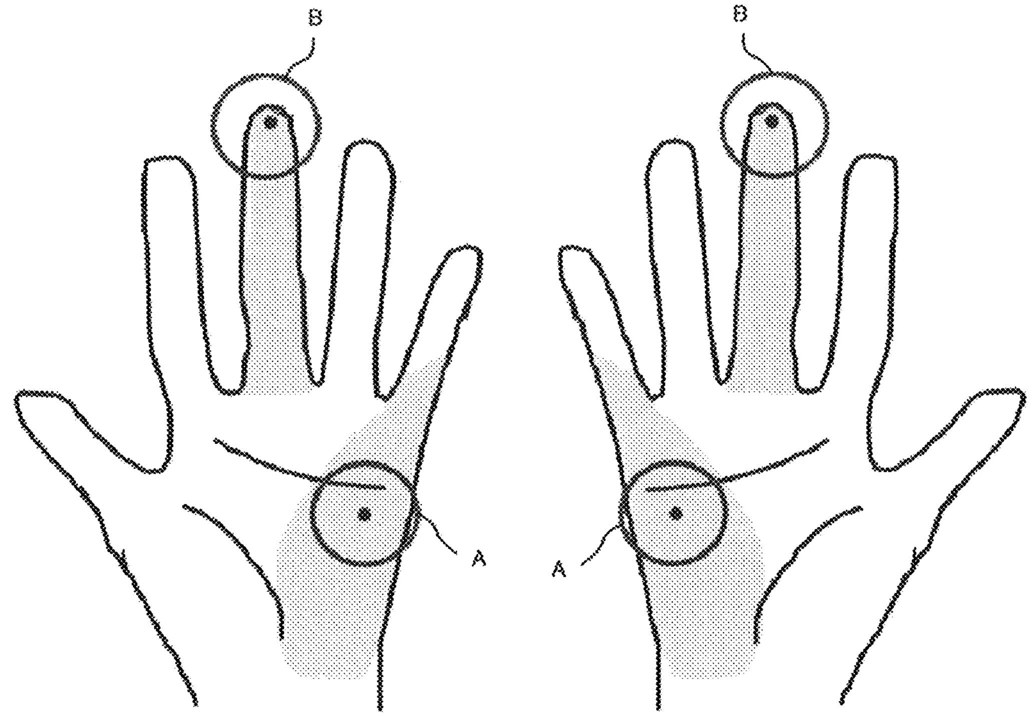
FIG. 30 is a view illustrating positions of two Pacinian corpuscles present in hands.

The Pacinian corpuscle is a sensory receptor that detects the pressure, and in the hand, as illustrated in FIG. 30, the Pacinian corpuscles are present near a central portion of the palm (a surface from a wrist to a base of finger that is the inner side when the hand is gripped) on the little finger side (A in the figure) and at a tip portion of a middle finger (B in the figure). Among them, the Pacinian corpuscle according to the present invention is the Pacinian corpuscle present in the palm (A in the figure). An instrument 1 according to the embodiment stimulates the Pacinian corpuscle present near the central portion of the palm on the little finger side. An object of the present invention is to reduce pain on a side on which a muscle extends during muscle stretching by pressure stimulation to the Pacinian corpuscle (for the Pacinian corpuscle, see for example, Shoichi Ishiura (Superviser), "Motion and Body Illustration; Mechanism of Brain and Nerves", Mynavi Publishing Corporation, Mar. 29, 2016, p. 45-46, and Seiji Ozawa and Koichiro Fukuda (Editors), "Standard physiology", Igaku-Shoin Ltd., Apr. 1, 2009, p. 221-223, and for the position of the Pacinian corpuscle, see for example, Johansson R S, Vallbo A B (1983) Tactile sensory coding in the glabrous skin of the human hand. Trends Neurosci 6: 27-31, Hie-yong Jeong, Makoto Kaneko, Mitsuru Higashimori, and Kanji Matsukawa (2007), "Improvement of Tactile Sensitivity under Pressing a Finger Base", Transactions of the Society of Instrument and Control Engineers, Vol. 43, No. 11, p. 973-979, https://www.jstage.jst.go.jp/article/sicetr1965/43/11/43_973/_pdf/-char/ja, https://www.jstage.jst.go.jp/article/sicetr1965/43/11/43_973/article/-char/ja/, Yuki Mori, Takayuki Tanaka, Shun'ichi Kaneko (2010) "Design of Vibration Alert Interface based on Vibration Strength Considering Skin Deformation with Respect to Grip Force", The transaction of Human Interface Society, Vol. 12, No. 2, pp. 103-111, and https://www.jstage.jst.go.jp/article/his/12/2/12_103/_pdf/-char/ja).

EMBODIMENT (Configuration of Instrument 1)

A configuration of the instrument 1 will be described with reference to FIGS. 1 to 4. The instrument 1 according to the embodiment is an instrument for increasing a range of motion of a joint. Specifically, an object of the instrument is to promote muscle stretching while reducing pain on the side on which the muscle extends during the muscle stretching, and increase the range of motion of the joint during motion, thereby making it possible to exercise more smoothly.

Figure 1:
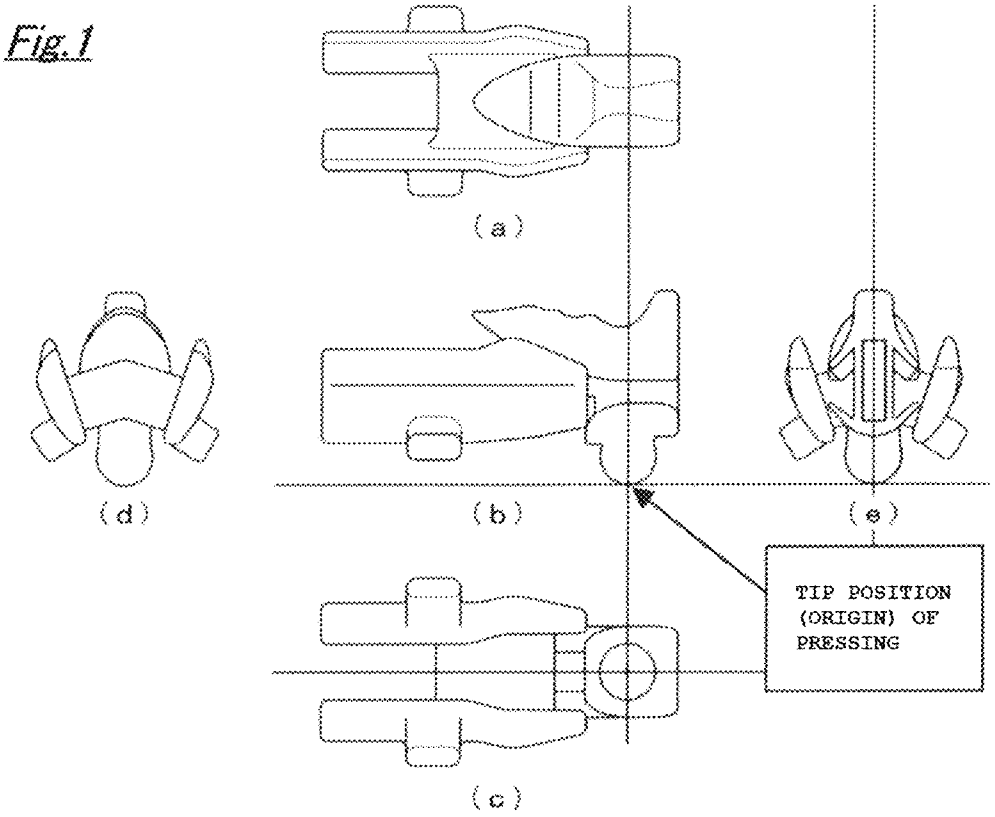
FIG. 1 is a view illustrating a configuration of an instrument according to an embodiment.
Figure 2:
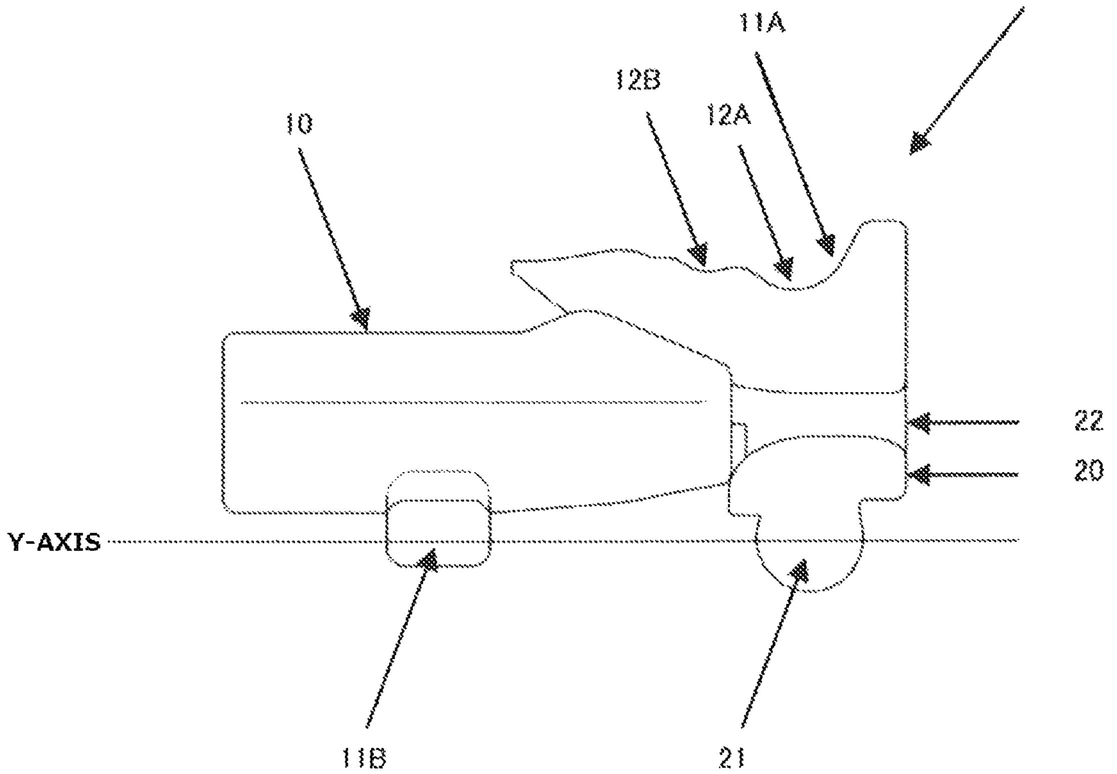
FIG. 2 is an enlarged view of FIG. 1(*b*).
Figure 3:
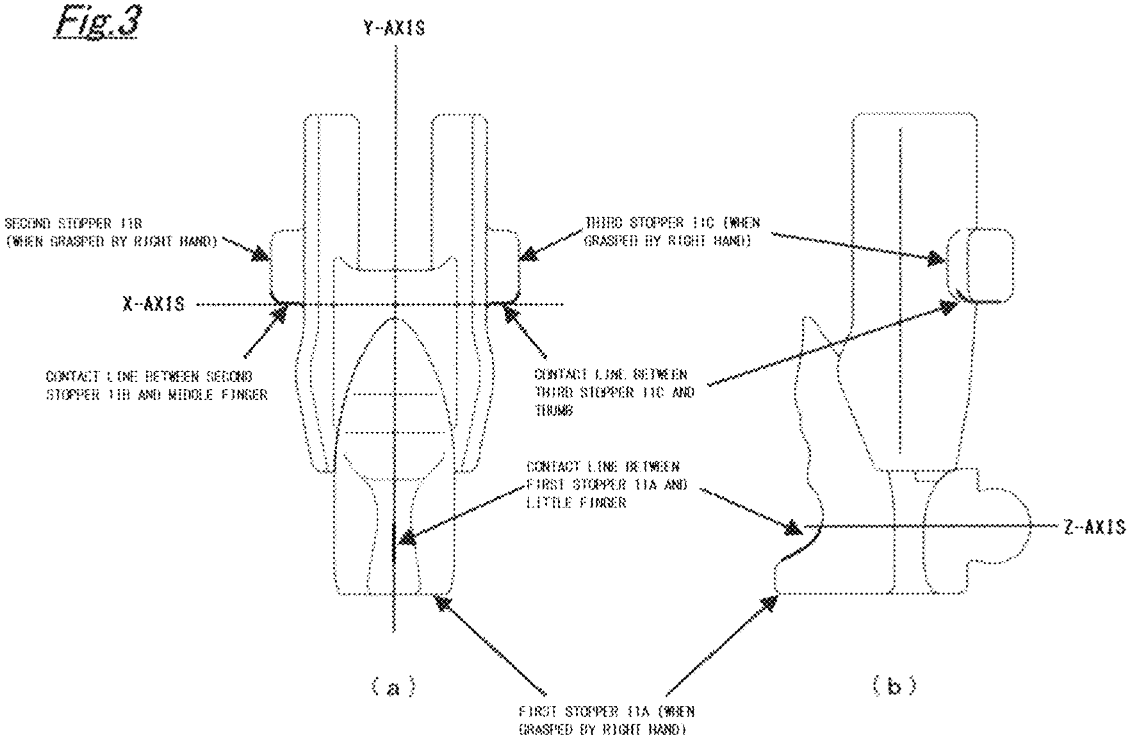
FIG. 3 is a view illustrating a configuration of the instrument according to the embodiment.
Figure 4:
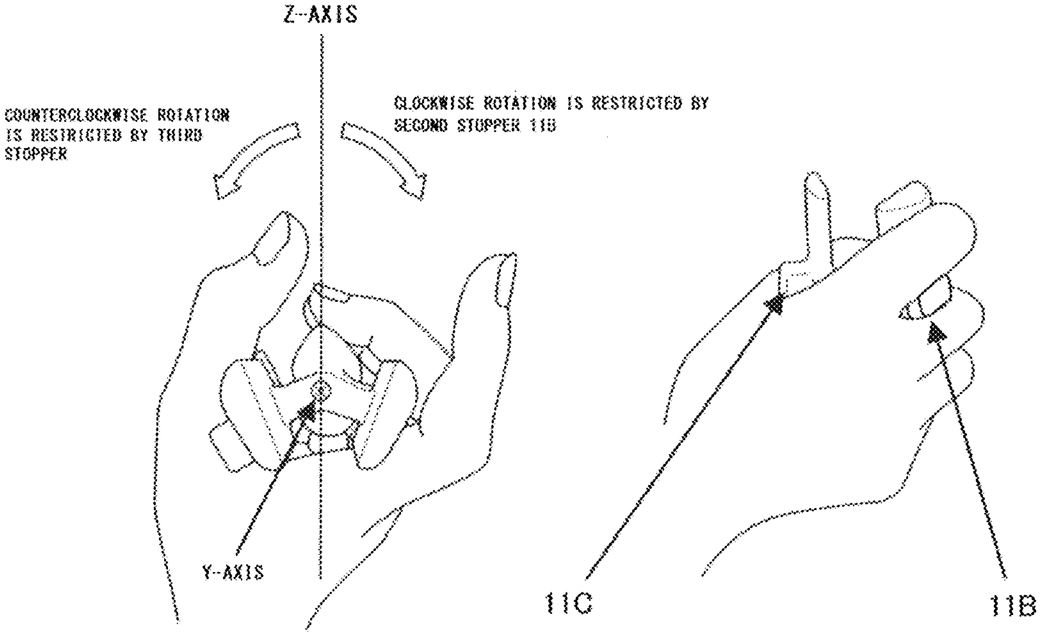
FIG. 4 is a view illustrating a function of the instrument according to the embodiment.
Figure 5:
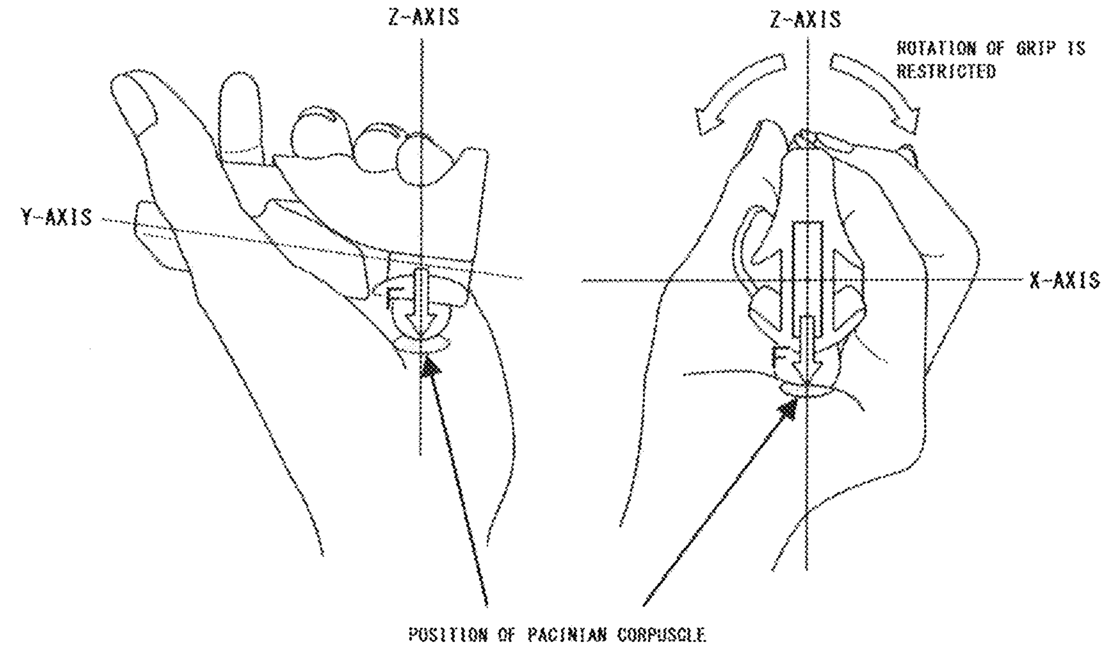
FIG. 5 is a view illustrating the function of the instrument according to the embodiment.

FIG. 1(*a*) is a plan view of the instrument 1, FIG. 1(*b*) is a right side view of the instrument 1, FIG. 1(*c*) is a bottom view of the instrument 1, FIG. 1(*d*) is a rear view of the instrument 1, and FIG. 1(*e*) is a front view of the instrument 1. FIG. 2 is an enlarged view of FIG. 1(*b*). FIG. 3(*a*) is a plan view of the instrument 1, and FIG. 3(*b*) is a left side view of the instrument 1. Further, FIGS. 4 and 5 are views for explaining functions of respective units of the instrument 1.

Note that in the following description, as illustrated in FIG. 3, a horizontal direction with respect to an imaginary line that is perpendicular to a Y-axis and connects two second stoppers 11B will be described as an X-axis, a longitudinal direction of the instrument 1 will be described as the Y-axis, and a horizontal direction with respect to an imaginary line that is perpendicular to the Y-axis and connects a first recess 12A and a contact portion 21 will be described as a Z-axis.

The instrument 1 is designed so that the contact portion 21 of the instrument 1 hits the position of the Pacinian corpuscle by grasping the instrument 1 by a grasping method to be described later. The instrument 1 is designed to apply stimulation by pressing the Pacinian corpuscle with a contact surface 21A of the contact portion 21 of the instrument 1 with a gripping force of the little finger and an auxiliary gripping force of a ring finger. Note that the contact portion 21 has a spherical shape so that only the Pacinian corpuscle can be pressed at a pinpoint (it is preferable to have a shape that does not stimulate (does not touch or hardly touch) a portion other than the Pacinian corpuscle).

The instrument 1 includes a main body portion 10 grasped by a user, and the pressing portion 20 that is provided to protrude from the main body portion 10, and presses to stimulate the Pacinian corpuscle present in the palm of the user in a state where the main body portion 10 is grasped by the user. The pressing portion 20 includes the contact portion 21 (Pacinian ball) having the contact surface 21A that contacts the Pacinian corpuscle, and a connecting portion 22 that is separated from the palm of the user in the state where the main body portion 10 is grasped by the user and connects the main body portion 10 and the contact portion 21. Here, the contact portion 21 has a shape (although it has a ball shape in the present embodiment, it is sufficient that only the Pacinian corpuscle can be pressed at the pinpoint, and other shapes are not excluded) capable of pressing only the Pacinian corpuscle at the pinpoint (it is preferable to have the shape that does not stimulate (does not touch or hardly touch) the portion other than the Pacinian corpuscle).

In addition, the main body portion 10 of the instrument 1 includes a first stopper 11A that is provided to protrude from the main body portion 10, and contacts the little finger of the user in the state where the main body portion 10 is grasped by the user to position the instrument 1 in the palm of the user. The first stopper 11A restricts movement in an upward direction of the Y-axis.

In addition, the main body portion 10 of the instrument 1 includes a second stopper 11B that is provided to protrude from the main body portion 10, positioned between an index finger and the middle finger of the user in the state where the main body portion 10 is grasped by the user, and restricts rotation of the instrument 1 in the palm of the user. The first stopper 11A restricts movement in a downward direction of the Y-axis.

In addition, the main body portion 10 of the instrument 1 includes a third stopper 11C that is provided to protrude from the main body portion 10, and contacts a portion near a base of thumb of the user in the state where the main body portion 10 is grasped by the user to restrict the rotation of the instrument 1 in the palm of the user. As illustrated in FIG. 3, the first stopper 11A restricts the movement in the downward direction of the Y-axis.

As described above, the movement of the instrument 1 in the downward direction of the Y-axis is restricted by the first to third stoppers 11A to 11C, and the position of the instrument 1 in the palm does not move in the Y-axis direction at a gripping position. In addition, when the instrument 1 rotates in the palm, the contact portion 21 is displaced from the position of the Pacinian corpuscle. In order to press the Pacinian corpuscle with the contact portion 21 by a force of the little finger, the instrument 1 should not rotate in the palm. Therefore, as illustrated in FIG. 4, since the second stopper 11B restricts rotation in a clockwise direction, and the third stopper 11C restricts rotation in a counterclockwise direction, the rotation of the instrument 1 grasped by the palm is restricted, and a pressing force of the little finger is reliably transmitted to the Pacinian corpuscle via the instrument 1. As described above, the instrument 1 is designed so that the instrument 1 comes to an intended position of the palm (a position where the contact portion 21 (Pacinian ball) of the pressing portion 20 contacts the Pacinian corpuscle) at three points of the first stopper 11A as a starting point, the second stopper 11B, and the third stopper 11C.

In addition, the main body portion of the instrument 1 has the first recess 12A for positioning the little finger of the user at a position substantially opposite to a position where the pressing portion 20 is provided. In addition, the main body portion 1 of the instrument 1 has a second recess 12B for positioning the ring finger of the user adjacent to the first recess 12A. The instrument 1 of the embodiment is configured such that by grasping the main body portion 10 with the little finger of the user positioned in the first recess 12A and the ring finger of the user positioned in the second recess 12B of the main body portion 10, the Pacinian corpuscle is pressed by the pressing portion 20 with an appropriate force as illustrated in FIG. 5.

Note that in the instrument 1 of the embodiment, the pressing portion 20 has a spherical shape. This is because when the Pacinian corpuscle is pressed and stimulated, if stimulation is applied to other sensory receptors and the like around the Pacinian corpuscle, they become disturbance, and sensitivity of pressure stimulation to the Pacinian corpuscle is reduced. By making the contact portion 21 (Pacinian ball) of the pressing portion 20 spherical, the pressure stimulation can be concentrated only on the Pacinian corpuscle, so that a space of a predetermined range is formed around the contact portion 21 of the ball-shaped pressing portion 20 that applies pressure, and effects of the present invention is increased. Note that since an appropriate pressure can be applied to the Pacinian corpuscle by the contact portion 21 (Pacinian ball) of the pressing portion 20 included in the instrument 1 sinking into the palm by about 1 mm to 15 mm (preferably 3 to 10 mm), it is preferred that, as illustrated in FIG. 5, a space is formed around the contact portion 21 (Pacinian ball) so as not to apply stimulation to a sensory receptor other than the Pacinian corpuscle in a state where the contact portion 21 (Pacinian ball) of the pressing portion 20 included in the instrument 1 sinks into the palm by about 1 mm to 15 mm. In addition, it is sufficient that the space of the predetermined range is formed around the contact portion 21 of the pressing portion 20 and the pressure stimulation can be concentrated only on the Pacinian corpuscle, and the contact portion 21 of the pressing portion 20 does not necessarily have a spherical shape.

As described above, it is preferable to press the Pacinian corpuscle of the palm in a pinpoint manner. This point will be described in more detail. There is an ulnar nerve in the palm. Then, it is understood that other mechanoreceptors are present on the ulnar nerve in addition to the Pacinian corpuscle. In this situation, when the instrument according to the present invention is used, the instrument is preferably designed so that a pressure applied to the Pacinian corpuscle of the palm is greater than a pressure applied to the other mechanoreceptors of the palm. From another point of view, it is preferred that a space is formed around the contact portion when the instrument of the present invention is used. In other words, a region (non-contact region) where the instrument does not contact the palm is preferably formed outside a region (contact region) where the contact portion is in contact with the palm so as to surround the contact region.

As described above, the pressing portion 20 preferably press the Pacinian corpuscle of the palm in a pinpoint manner. It is preferred that the pressing portion 20 can be directed toward the Pacinian corpuscle of the palm when used and the contact portion 21 has a curved surface bulging toward the Pacinian corpuscle. The curved surface may be spherical or aspherical. Further, degree of bulging is appropriately determined. For example, when the Pacinian corpuscle is strongly stimulated, the degree of bulging is increased, and when the Pacinian corpuscle is weakly stimulated, the degree of bulging is reduced (brought close to a plane). Further, the pressing portion 20 may be formed of a column. When the pressing portion 20 is formed of a column, a bottom surface of the column serves as the contact portion 21, and the contact portion 21 has a planar shape. The plane faces and contacts the Pacinian corpuscle. Further, the pressing portion 20 may be formed of a plurality of columns having different radii and concentrically arranged. The pressing portion 20 may have any shape as long as it can be directed to the Pacinian corpuscle of the palm and can concentrate pressure on the Pacinian corpuscle when used.

(Method of Grasping Instrument 1)

A method of using the instrument 1 (The grasping method) will be described with reference to FIGS. 6 and 7.

Figure 6:
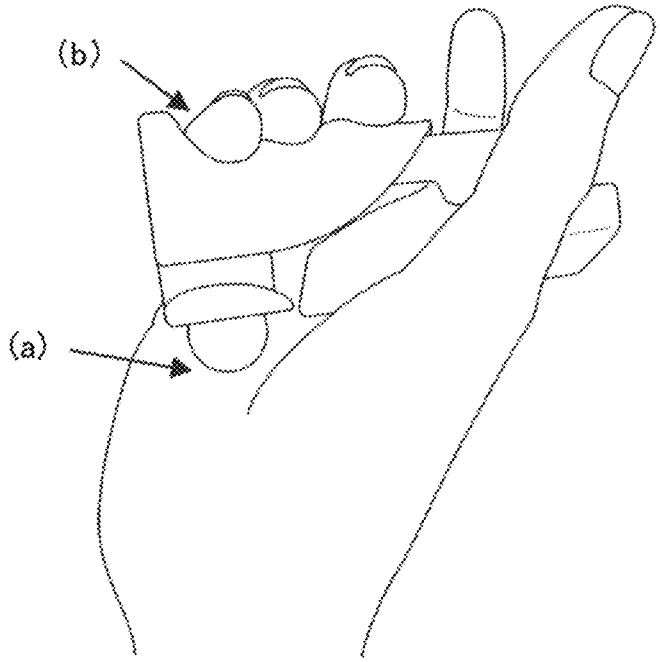
FIG. 6 is a view illustrating a method of grasping the instrument according to the embodiment.

(1) The contact surface 21A of the contact portion 21 (Pacinian ball) of the instrument 1 is aligned with the position of the Pacinian corpuscle (see FIG. 6(*a*)).

(2) The little finger is brought into contact with the second stopper 11B, and the main body portion 10 of the instrument 1 is grasped by placing the little finger in the first recess 12A and placing the ring finger in the second recess 12B (see FIG. 6(*b*)).

Since the fingers and the hand conform to a shape of a grasped body, a position of a little finger stopper can be grasped even if the contact portion 21 (Pacinian ball) is aligned with the position of the Pacinian corpuscle.

(3) The middle finger is brought into contact with the second stopper 11B to grasp the main body portion 10 of the instrument 1 (see FIG. 7(*a*)).

(4) The portion near the base of the thumb (a webbed portion) is brought into contact with the third stopper 11C to grasp the main body portion 10 of the instrument 1 (see FIG. 7(*b*)).

(5) The position of the instrument 1 is properly determined in the palm by the first to third stoppers 11A to 11C. In other words, the contact surface 21A of the contact portion 21 of the instrument 1 is aligned with the Pacinian corpuscle (see FIG. 7(*c*)).

Note that as illustrated in FIG. 3(*a*), the instrument 1 is configured to be bilaterally symmetrical about the Y-axis in plan view, but does not necessarily have to be configured to bilaterally symmetrical about the Y-axis in plan view.

As described above, the instrument 1 according to the embodiment is an instrument for increasing the range of motion of the joint. The instrument 1 includes the main body portion 10 grasped by the user, and the pressing portion 20 that is provided to protrude from the main body portion 10, and presses to stimulate the Pacinian corpuscle present in the palm of the user in the state where the main body portion 10 is grasped by the user. Therefore, stretching can be performed in a state where the Pacinian corpuscle is stimulated, and the range of motion of the joint can be more effectively increased.

The pressing portion 20 of the instrument 1 according to the present embodiment includes the contact portion 21 having the contact surface that contacts the Pacinian corpuscle, and the connecting portion 22 that is separated from the palm of the user in the state where the main body portion 10 is grasped by the user and connects the main body portion 10 and the contact portion. Therefore, it is possible to press and stimulate only the Pacinian corpuscle, and to increase the range of motion of the joint by causing muscle relaxation more effectively.

The main body portion 10 of the instrument 1 according to the present embodiment includes the first recess 12A for positioning the little finger of the user at the position substantially opposite to the position where the pressing portion 20 is provided, and is configured such that the Pacinian corpuscle is pressed by the pressing portion 20 by grasping the main body portion 10 in a state where the little finger of the user is positioned in the first recess 12A of the main body portion 10. In this way, since the instrument 1 can be positioned in the palm of the user, the Pacinian corpuscle can be reliably pressed and stimulated.

The main body portion 10 of the instrument 1 according to the present embodiment includes the second recess 12B for positioning the ring finger of the user adjacent to the first recess 12A, and is configured such that the Pacinian corpuscle is pressed by the pressing portion 20 by grasping the main body portion 10 in a state where the ring finger of the user is positioned in the second recess 12B of the main body portion 10. In this way, since the instrument 1 can be positioned in the palm of the user, the Pacinian corpuscle can be reliably pressed and stimulated.

The main body portion 10 of the instrument 1 according to the present embodiment includes the first stopper 11A that is provided to protrude from the main body portion 10, and contacts the little finger of the user in the state where the main body portion 10 is grasped by the user to position the instrument in the palm of the user. In this way, since the instrument 1 can be positioned in the palm of the user, the Pacinian corpuscle can be reliably pressed and stimulated.

The main body portion 10 of the instrument 1 according to the present embodiment includes the second stopper 11B that is provided to protrude from the main body portion 10, positioned between the index finger and the middle finger of the user in the state where the main body portion 10 is grasped by the user, and restricts the rotation of the instrument 1 in the palm of the user. In this way, since the instrument 1 can be positioned in the palm of the user, the Pacinian corpuscle can be reliably pressed and stimulated.

The main body portion 10 of the instrument 1 according to the present embodiment includes the third stopper 11C that is provided to protrude from the main body portion 10, and contacts the portion near the base of the thumb of the user in the state where the main body portion 10 is grasped by the user to restrict the rotation of the instrument in the palm of the user. In this way, since the instrument 1 can be positioned in the palm of the user, the Pacinian corpuscle can be reliably pressed and stimulated.

Modification of Embodiment

FIG. 8 is a view illustrating a configuration of the instrument 1 according to a modification of the embodiment. FIG. 8(*a*) is a view in which the instrument 1 according to the modification of the embodiment is exploded, and FIG. 8(*b*) is a view in which the instrument 1 according to the modification of the embodiment is assembled. In the above embodiment, positions of the pressing portion 20 and the first to third stoppers 11A to 11C of the instrument 1 are fixed to the main body portion 10, but the instrument 1 according to the modification of the embodiment is configured such that the pressing portion 20 and the first to third stoppers 11A to 11C can be separated from the main body portion 10.

As illustrated in FIG. 8(*a*), in the instrument 1 according to the modification of the embodiment, the main body portion 10 is configured to be separable into a first main body portion 101, a second main body portion 102, a third main body portion 103, and a fourth main body portion 104. The first main body portion 101 is provided with a recess 101*b* with a longitudinal direction parallel to the Y-axis, and the pressing portion 20 is provided with a protrusion 20*a* slidably engaged with the recess 101*b*. Then, the protrusion 20*a* of the pressing portion 20 is slidably engaged with the recess 101*b* of the first main body portion 101, so that a position of the contact portion 21 (Pacinian ball) of the pressing portion 20 can be adjusted in parallel to the Y-axis.

Further, the first main body portion 101 is provided with a protrusion 101*a* with a longitudinal direction parallel to the Y-axis, and the second main body portion 102 is provided with a recess 102*c* slidably engaged with the protrusion 101*a* of the first main body portion 101. Then, the protrusion 101*a* of the first main body portion 101 is slidably engaged with the recess 102*c* of the second main body portion 102, so that a position of the first stopper 11A (little finger stopper) can be adjusted parallel to the Y-axis (note that the position of the contact portion 21 (Pacinian ball) is also adjusted by adjusting the position of the first stopper 11A (little finger stopper)).

Further, the second main body portion 102 is provided with a protrusion 102*a* with a longitudinal direction parallel to the Y-axis, and the third main body portion 103 is provided with a recess 103*b* slidably engaged with the protrusion 102*a* of the second main body portion 102. Then, the recess 103*b* of the third main body portion 103 is slidably engaged with the protrusion 102*a* of the second main body portion 102, so that a position of the third stopper 11C (a thumb stopper) can be adjusted in parallel with the Y-axis.

Further, the second main body portion 102 is provided with the protrusion 102*b* with a longitudinal direction parallel to the Y-axis, and the fourth main body portion 104 is provided with a recess 104*b* slidably engaged with the protrusion 102*b* of the second main body portion 102. Then, the recess 104*b* of the fourth main body portion 104 is slidably engaged with the protrusion 102*b* of the second main body portion 102, so that a position of the second stopper 11B (a middle finger stopper) can be adjusted in parallel with the Y-axis.

With such a configuration, it is possible to adjust the positions of the contact portion 21 (Pacinian ball) of the pressing portion 20 and the first to third stoppers 11A to 11C according to differences in size and shape of the hand of each user, and by grasping the instrument with one hand, the contact portion 21 (Pacinian ball) of the pressing portion 20 can accurately hit the Pacinian corpuscle and apply an appropriate pressure to the Pacinian corpuscle.

Note that the instrument 1 according to the modification of the embodiment illustrated in FIG. 8 is equivalent to the instrument 1 according to the embodiment described with reference to FIGS. 1 to 7 in terms of functions and configurations other than that the positions of the contact portion 21 (Pacinian ball) of the pressing portion 20 and the first to third stoppers 11A to 11C can be adjusted according to the differences in size and shape of the hand of each user. Therefore, redundant description of the functions and the grasping method of the instrument 1 according to the modification of the embodiment illustrated in FIG. 8 will be omitted (see FIGS. 4 to 7 and corresponding descriptions for the functions and the grasping method).

In addition, as will be described later in Example, the effects of the present invention is exhibited as long as the stimulation can be applied to the Pacinian corpuscle by pressing or the like. Therefore, the instrument 1 according to the embodiment described with reference to FIGS. 1 to 6 does not necessarily have a shape to be grasped with one hand, and may be, for example, a clip-shaped instrument provided with a pressing portion that contacts the Pacinian corpuscle so as to sandwich the palm and apply stimulation to the Pacinian corpuscle by pressing. In addition, a pressing portion having a contact surface in contact with the Pacinian corpuscle may be provided inside a glove.

[Application]

Since the instrument according to the present invention promotes the muscle stretching, it is effective for various applications involving the muscle stretching. For example, specific applications can include instruments for improving motion function (for example, for muscle stretching training (for example, stretching, yoga, and muscle training), for athletics (for example, sprint, marathon, and long jump), for ball game (for example, baseball and golf), for ice sports (for example, figure skating and jumping), and for rehabilitation (for example, low back pain, frozen shoulder, and stiff shoulder)). Here, for example, in the case of golf, when a glove provided with a Pacinian corpuscle pressing portion inside the glove is used, an effect of further raising an arm can be expected. In addition, in the case of figure skating, when a figure skater rotates while pressing the Pacinian corpuscle of the palm, the number of rotations can be expected to be further increased. The present invention can further improve performance for athletes, and can improve muscle flexibility without pain for ordinary people. Note that in order to further achieve the effects of the present invention, it is preferable to continuously press the Pacinian corpuscle for a predetermined time (for example, about minutes).

EXAMPLES (Purpose of the Present Example)

In the present example, test was performed on the following 8 men and women (hereinafter referred to as a subject) of different ages by the following method using a grip (the instrument 1 described with reference to FIGS. 1 to 5).

(Subject)

Randomly selected men and women in their twenties to seventies (total 8 people) were measured.

1 female in her twenties
2 males and 1 female in their thirties
1 male and 2 females in their forties
1 female in her seventies Attributes of the subject measured this time are shown in Table 1 below.

TABLE 1

| | Attribute | |
|---|---|---|
| Subject number | Age (years old) | Sex |
| 1 | 29 | Female |
| 2 | 34 | Female |
| 3 | 36 | Male |
| 4 | 39 | Male |
| 5 | 41 | Male |
| 6 | 41 | Female |
| 7 | 42 | Female |
| 8 | 70 | Female |

(Measurement Method 1)

The subject was asked to perform three types of measurement motions (three types of lateral bending, leg raising, and waist twisting) under three types of states, that is, an empty hand (a state in which nothing is grasped), a stick grasping state (a state in which a stick is grasped), and a grip grasping state (a state in which the grip is grasped), and the subject was asked about muscle pain and stretching during the muscle stretching. As a result, for all the three types of measurement motions (three types of lateral bending, leg raising, and waist twisting), it was confirmed that the pain and stretching of the muscle during the muscle stretching were smaller during grip grasping than during the empty hand or stick grasping for all subjects.

(Measurement Method 2)

Figure 9:
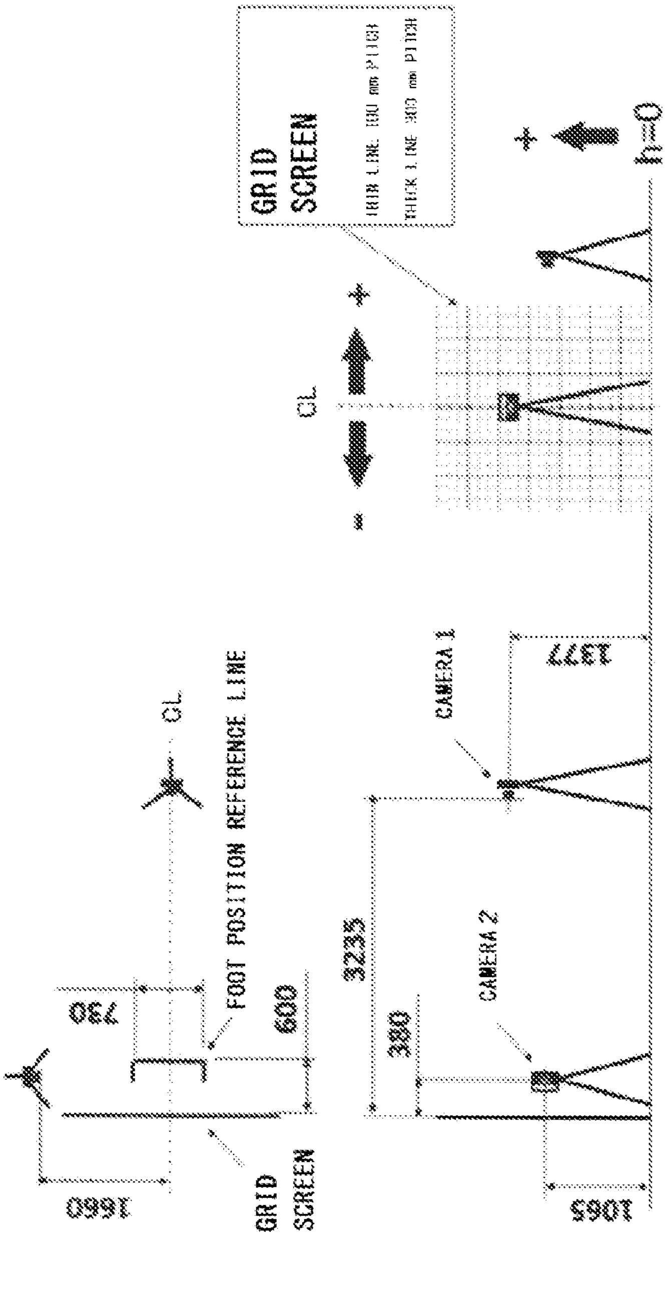
FIG. 9 is a view for explaining measurement in Example.

The subject was caused to stand at a predetermined position, the three types of measurement motions (three types of lateral bending, leg raising, and waist twisting) were photographed by a video camera (a camera 1 and a camera 2), and angles of the range of motion of the joint were measured under states of the empty hand (the state in which nothing is grasped), the stick grasping state (the state in which a stick is grasped), and the grip grasping state (the state in which the grip is grasped). Note that in the measurement, a mat for fixing a position of a foot of the subject was placed on the floor. Photographing with the video camera was performed on the subject by placing one video camera in front of and one video camera in a side of the subject (see FIG. 9).

Specifically, the subject was measured by the following procedure.

The subject stands in line with a predetermined foot position reference line and performs the three types of measurement motions.

(Camera 1)

The camera 1 photographs the range of motion of the joint in various motions of the subject, and used them as data to check increase of the range of motion of the joint.

(Camera 2)

Various motions were photographed from the side of the subject with the camera 2, it was checked from the side whether the positions of the feet of the subject during the motion were correct, and it was checked whether the motion was performed at a correct angle of a body of the subject during each motion.

(Type of Motion for Effect Measurement)

Figure 10:
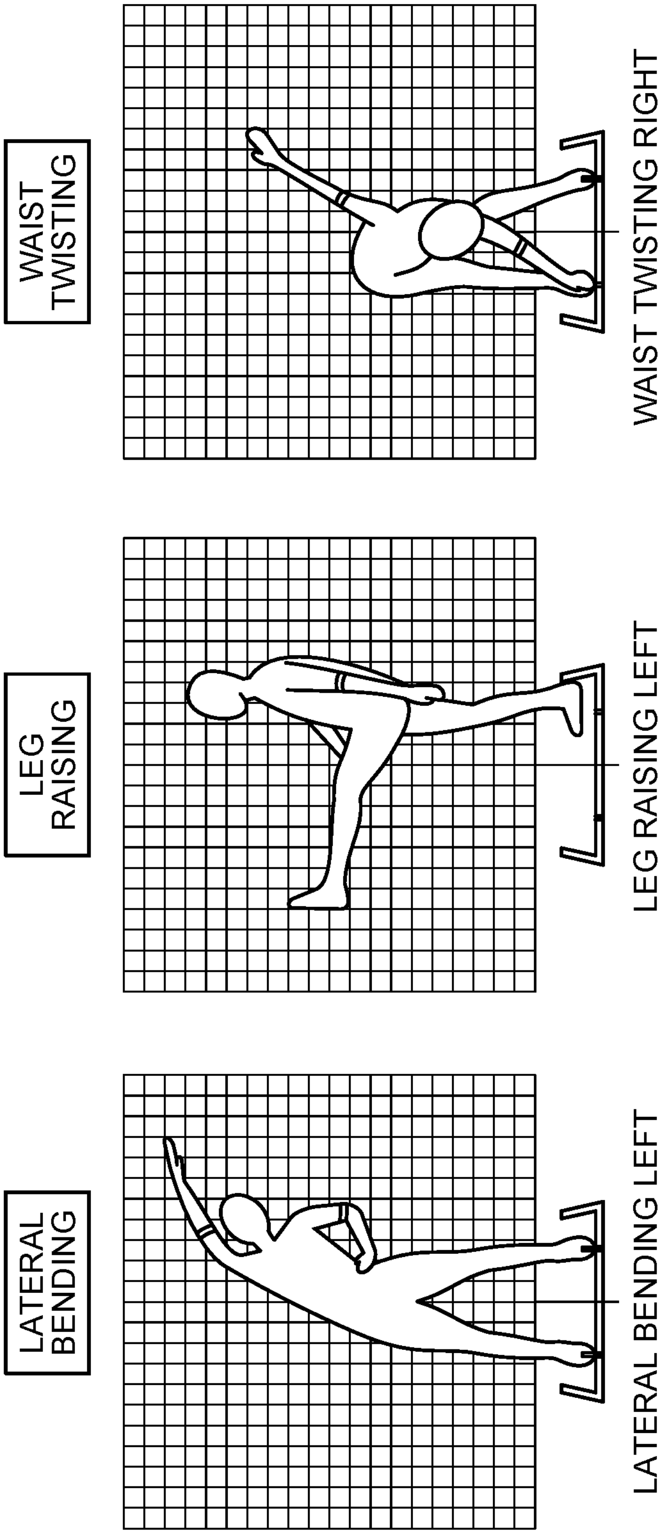
FIG. 10 is a view for explaining the measurement in Example.

As motions for effect measurement (hereinafter referred to as measurement motions), the three types of lateral bending, leg raising, and waist twisting were respectively performed on left and right sides (see FIG. 10).

(Positioning of Feet)

A distance of the subject from the camera 1 was kept constant and positioning for the subject to stand at a right angle to a line of sight of the camera 1 was performed as follows.

Figure 11:
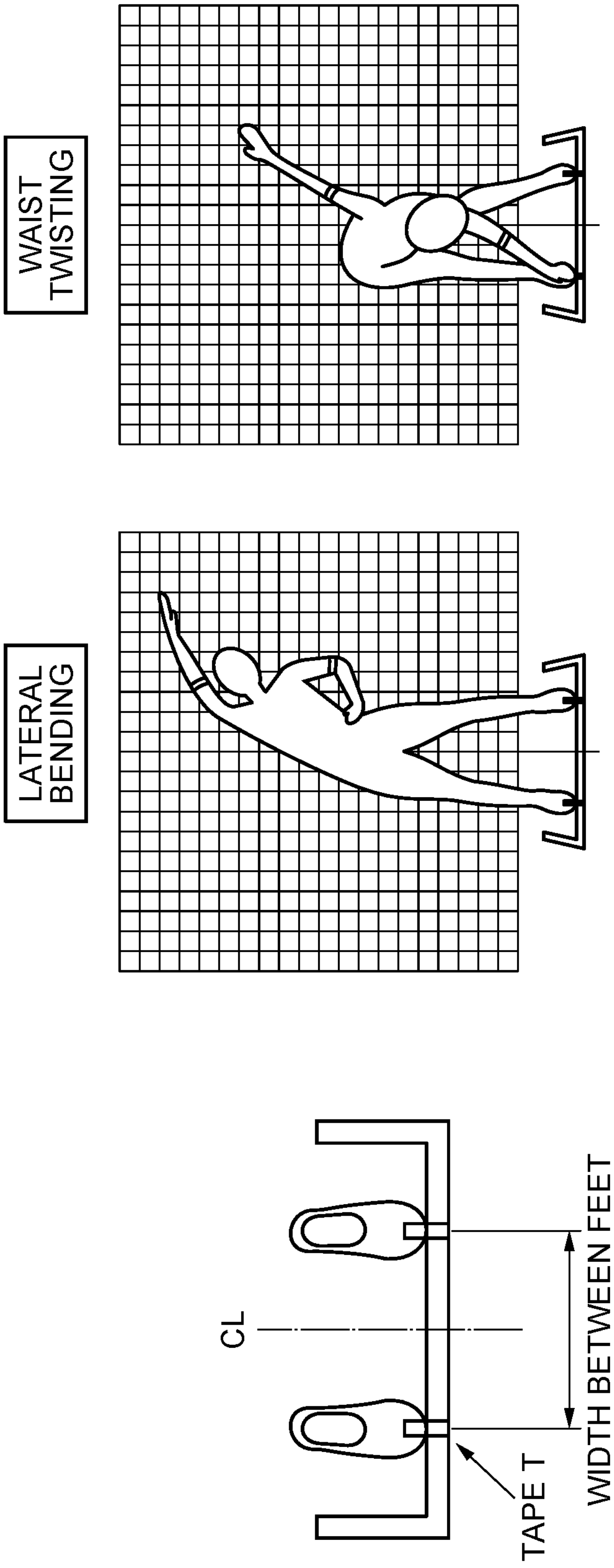
FIG. 11 is a view for explaining the measurement in Example.

(a) Foot positions for lateral bending and waist twisting (see FIG. 11)

- The subject was asked to stand with toe tips of shoes aligned with a foot positioning line.
- A width between feet was determined by opening legs about a vertical axis center line (CL) with a width of easy motion of each subject.
- As illustrated in the figure, tapes T were attached to the tips of the shoes and the floor at positions determined by the subject oneself so that the feet could return to their original positions even if the feet were displaced during the test.
- Whether a standing position of the subject during motion measurement was correct was checked by an image of the camera 1, and whether the image can be used for data was determined.

Figure 12:
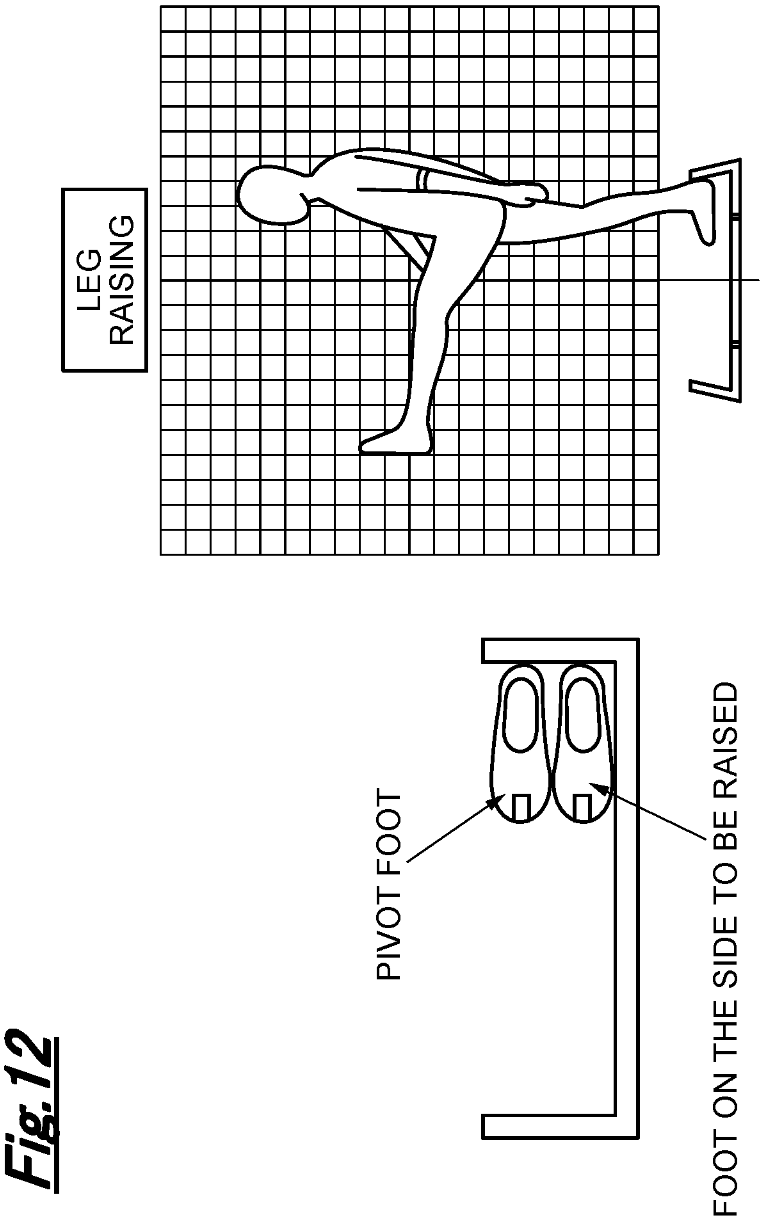
FIG. 12 is a view for explaining the measurement in Example.

(b) Foot position of leg raising (see FIG. 12)

- The subject was asked to stand with a heel portion and a side surface of a shoe of a foot on the side to be raised being along a line L indicated by the foot position reference line.
- For a position of a pivot foot of the subject, a foot position on the side to be raised was determined, and then the foot position of the pivot foot was set to touch a shoe on the side to be raised, and so that a position of a heel was set along a frame line indicated by the line L.
- The subject checked the foot position each time the subject took a leg raising motion.
- Whether the foot position of the subject during motion measurement was correct was checked by an image of the camera 2, and whether the image can be used for the data was determined.

(Measurement Procedure)

(a) The subjects were gathered one by one at a fixed time.

(b) A purpose of the measurement, a purpose of use of the data, safety management, risk, and the like were sufficiently explained to the subjects.

(c) The position of the Pacinian corpuscle of the subject was detected by a method described later, and marked with a marker (see detection of the position of the Pacinian corpuscle described later).

(d) The subjects were asked to perform warm-up exercise for about 5 minutes before the test to prepare their bodies.

(e) After the warm-up exercise, the subject immediately started the measurement exercise.

(Detection of Position of Pacinian Corpuscle of Palm)

As described above, the Pacinian corpuscles in the palm are one of mechanical receptors found in skin, and as described with reference to FIG. 1, are in a tip of the middle finger and the palm below the little finger, and are the range of motion of the joint that detects the pressure.

(Detection of Position of Pacinian Corpuscle of Middle Finger: See FIG. 13(*a*))

Since the Pacinian corpuscle is in the tip of the middle finger, it is easy to detect the position, and it was performed in order to allow the user to feel sensation of throbbing when the Pacinian corpuscle was pressed.

(a) A ventral side of the middle finger was stimulated using a pressure point pressing stick while changing locations, and difference in stimulation when pressed with the pressure point pressing stick was felt.

(b) Subsequently, a central portion of a tip (first joint) on the ventral side of the middle finger was slowly and quickly pressed with the pressure point pressing stick to detect a spot of throbbing pain (but it's comfortable pressure pain).

(c) Subsequently, the spot of throbbing pain (Pacinian corpuscle pressing portion named Pacinian-point) was marked with the marker.

(Detection of Position of Pacinian Corpuscle of Palm: See FIG. 13(*b*))

The Pacinian corpuscle in the palm pressed was detected in the measurement of the present example.

(a) The palm was stimulated using a pressure point pressing stick while changing locations, and difference in stimulation when pressed with the pressure point pressing stick was felt.

(b) Subsequently, a central portion of the palm on the little finger side was slowly and quickly pressed with the pressure point pressing stick to detect a spot of throbbing pain (but it's comfortable pressure pain) similar to that felt with the middle finger.

(c) Subsequently, the spot of throbbing pain (a Pacinian point) was marked with the marker.

Note that the Pacinian corpuscles were in almost the same position on the palm and the tip of the middle finger of all the subjects.

Figure 14:
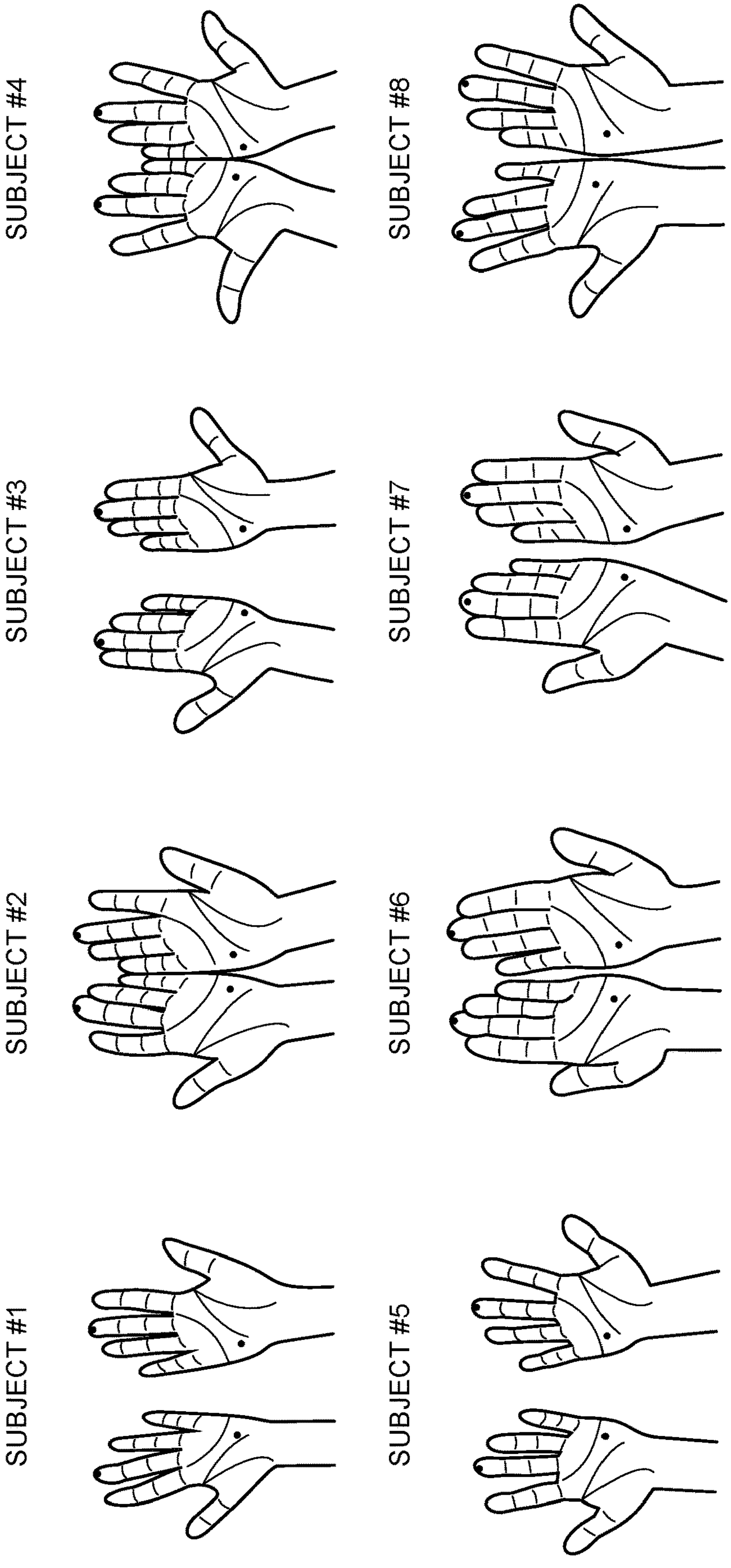
FIG. 14 is a view for explaining the measurement in Example.

FIG. 14 is an image illustrating the position of the Pacinian corpuscle detected on the palm of each subject. Note that a mark marked with a marker is surrounded by "○" because it is difficult to see in the image of FIG. 14.

(Measurement)

(a) At a time when a maximum angle of each motion was reached, the camera 1 and the camera 2 were simultaneously operated with two remote controllers so as not to shake the cameras, and images were taken continuously. About 30 images were taken continuously at one time.

(b) During the empty hand, the stick grasping, and the grip grasping, an experimenter checked whether the subject did not move from the determined position so that a position of the body (particularly, a position of the foot) did not shift, and also checked whether the grip properly hits the Pacinian corpuscle, so that the grip was grasped at the predetermined position.

(c) Intervals of 3 minutes were provided between the three types of motions, and the subject completed the motions.

Note that it was checked for each motion that the pressing portion 20 of the instrument 1 reliably hits (presses) the position of the Pacinian corpuscle of the palm of the subject.

(Definition of Origin)

An origin of the body of the subject (an origin for measuring an effect of increasing the range of motion of the joint) was defined as follows.

First, absolute coordinates were defined as follows.

(a) A floor surface was set to zero, and the upward direction was set to plus.

(b) The vertical axis center line CL was set to zero, a right direction was set to plus, and a left direction was set to minus.

(Grid Origin)

In addition, a position on the vertical axis center line (CL) at a position of 150 cm from the floor surface was defined as a grid origin for use in the measurement.

(Origin of Body of Subject)

The following origins were defined as origins for measuring the effect of increasing the range of motion of the joint.

origin of leg raising right origin of leg raising left origin of lateral bending left and right Concept of the origin of the body will be described below.

(a) Draw a center line of the foot of each subject. In addition, a line L1 passing through an approximate center of the body is drawn vertically at a position considered to be a joint of a femur (see FIG. 15(*a*)).

(b) A position where a line L2 passing through a central portion of the foot intersects the line L1 is defined as the origin of the body of the leg raising left. (see FIG. 15(*b*)).

Figure 15:
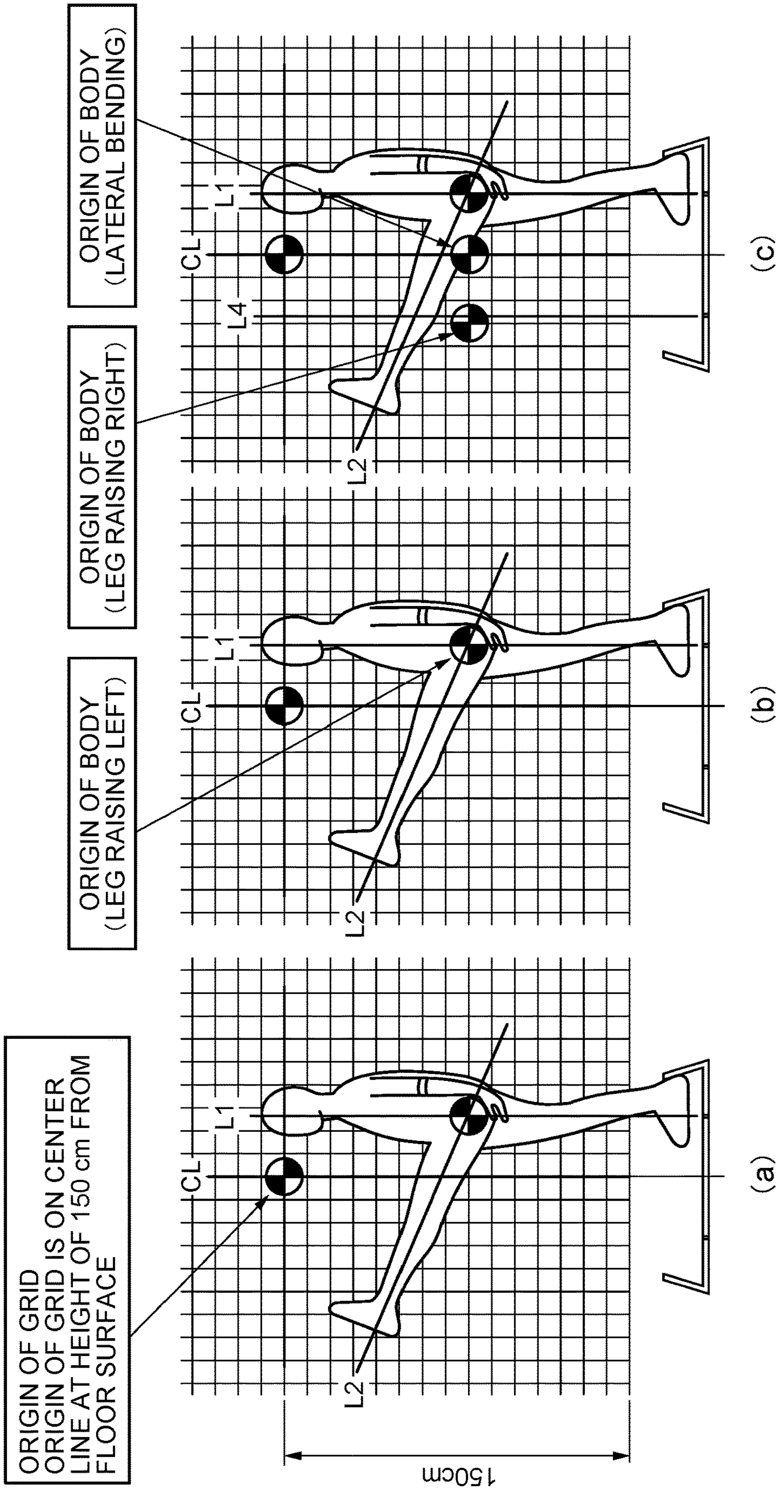
FIG. 15 is a view for explaining the measurement in Example.

(c) A position symmetrical about the vertical axis center line CL as the center line of the origin of the body of the leg raising left is defined as the origin of the body of the leg raising right, and a point intersecting the vertical axis center line CL at a height of the origin of the body of the leg raising right is defined as the origin of the body of lateral bending (see FIG. 15 (*c*)).

Next, a procedure for obtaining measurement results will be described.

Figure 16:
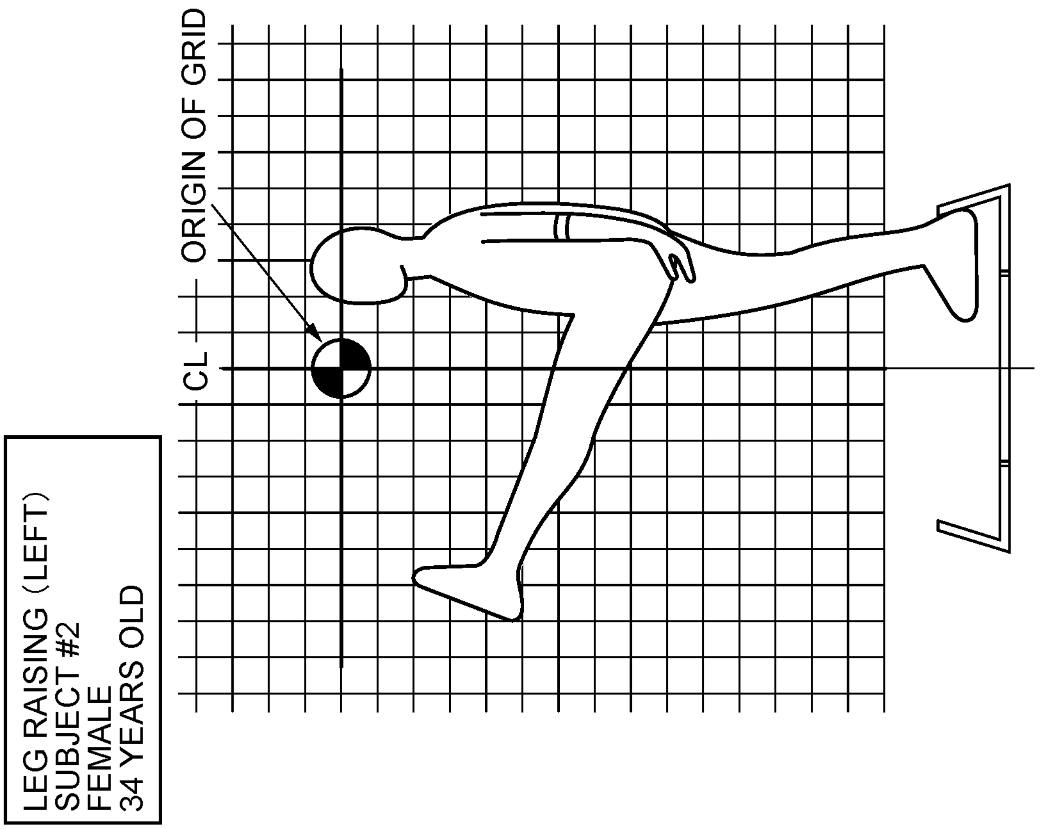
FIG. 16 is a view for explaining the measurement in Example.

The measurement results of each motion were compared using the origin of the body as a reference (see FIG. 16).

(a) From measurement images taken, an image with a maximum performance of each motion is selected.

(b) Using an illustration function, only the human body is extracted from the image and pasted on Power Point (registered trademark) (hereinafter, referred to as PPT) as image data.

(c) With a function of PPT, the image is pasted on a left and right center of PPT screen in full size in an up-down direction. Thus, all pasted images are pasted on the center of the PPT at the same scale. Therefore, a grid origin of any image is at the same position on the PPT screen, so that an accurate comparison can be made.

Figure 17:
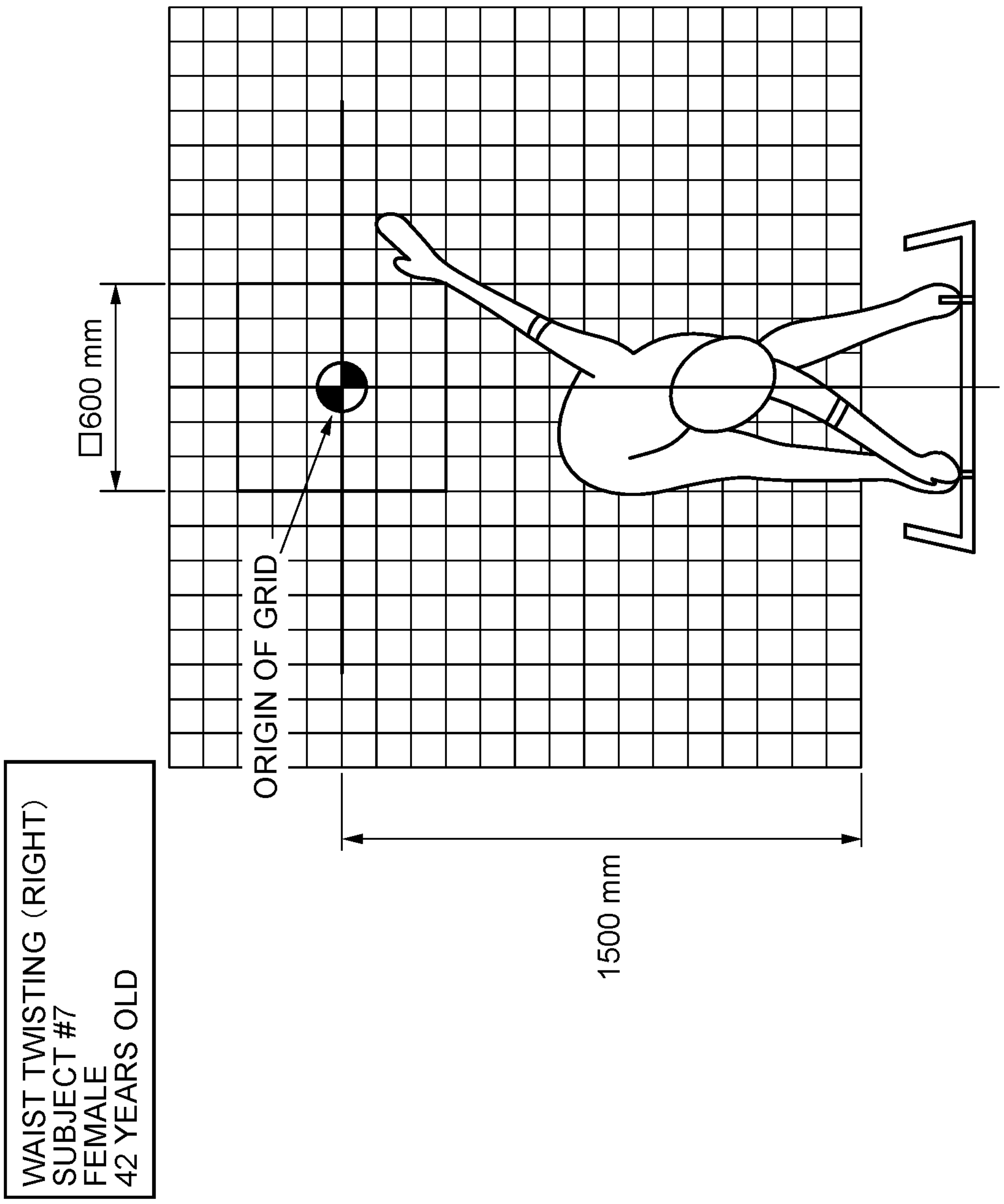
FIG. 17 is a view for explaining the measurement in Example.

Dimensional comparison method between the empty hand and the grip grasping (see FIG. 17)

(a) The image pasted on PPT was displayed on a 65 inch high vision liquid crystal monitor, a tracing paper was attached to the screen, the origin was set, and dimensions of measurement points and line copied on the tracing paper were measured using a ruler or a protractor.

(b) The measurement results were converted to actual dimensions at the following magnifications.

On the 65 inch screen, a box with an actual size of 600 mm was measured and found to be 167 mm. From this, measurement magnification of the screen was calculated as 600/167=3.593 times.

Figure 18:
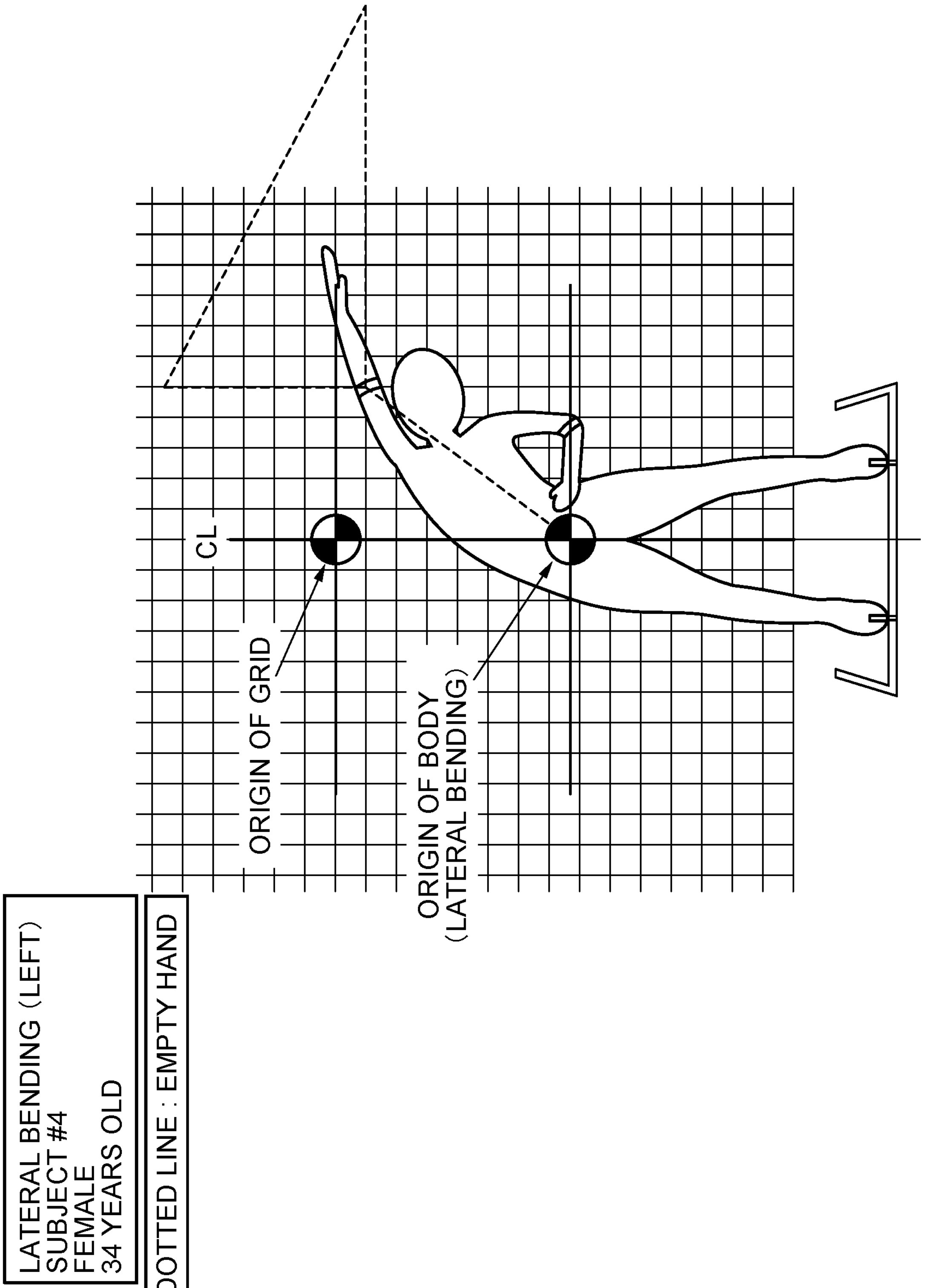
FIG. 18 is a view for explaining the measurement in Example.

Results of lateral bending (also regarding leg raising and waist twisting, a method of collecting data is basically the same) (see FIG. 18)

(a) The origin of the body described above (The origin of the body of lateral bending in FIG. 18) is specified.

(b) Place a point with a pencil at a central portion of an elbow joint in the image copied on the tracing paper. On PPT of a personal computer, a right angle portion of a white triangle is set as a point in accordance with the point.

(c) Connect a straight line (vertical axis center line) from the origin of the body of lateral bending to the point.

(d) A bending angle of a trunk inclined from the vertical axis center line CL is defined as the range of motion of the joint in lateral bending during the empty hand.

Figure 19:
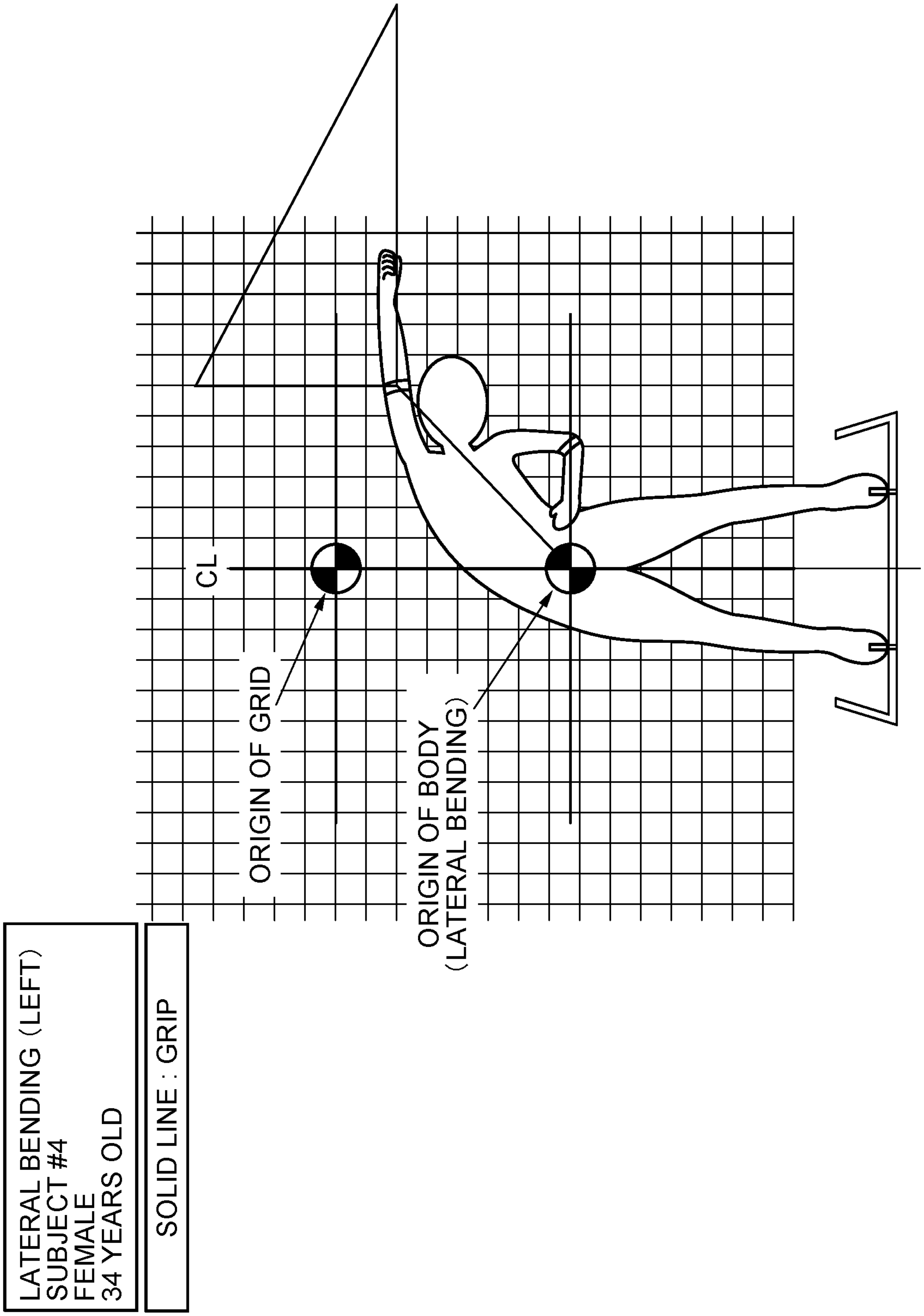
FIG. 19 is a view for explaining the measurement in Example.

(e) An angle of motion of the joint from the origin during the grip grasping is determined in the same procedure as during the empty hand (see FIG. 19).

(Comparison Between Empty Hand and Grip Grasping)

(a) An image during the grip grasping is processed by extracting only a human body using the illustration function.

(b) The above extracted image is pasted on an image of the empty hand.

Figure 20:
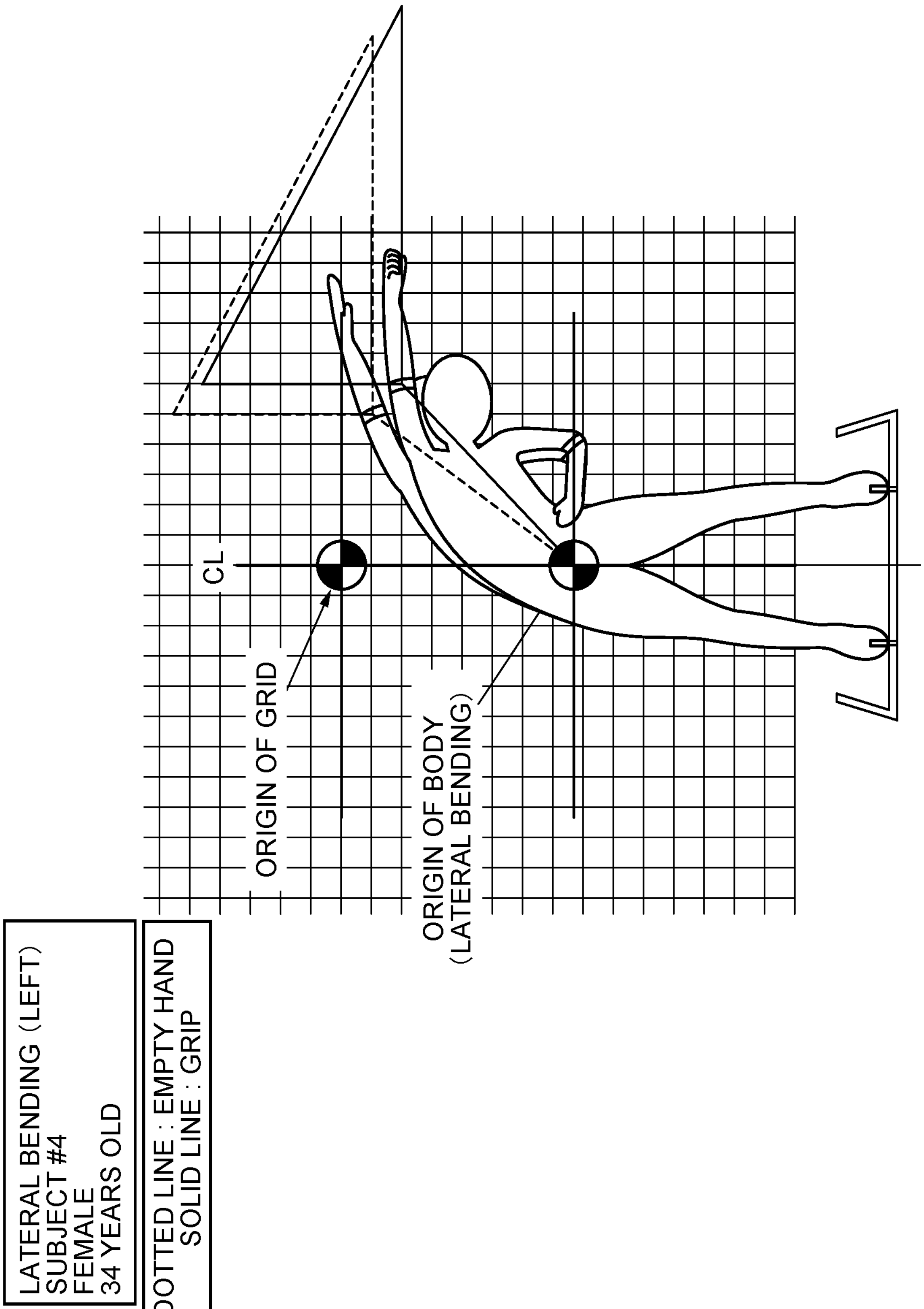
FIG. 20 is a view for explaining the measurement in Example.

Note that all images of only the human body pasted on PPT are extracted at the same scale and the same origin. Therefore, even when the image of the grip grasping is pasted on the image of the empty hand, the origin and the scale are kept accurately, and comparison is accurate (see FIG. 20). Note that comparison between the empty hand and the stick grasping was also made by the same procedure.

(Comparison Image of Measurement Results)

(Lateral bending)

Figure 21:
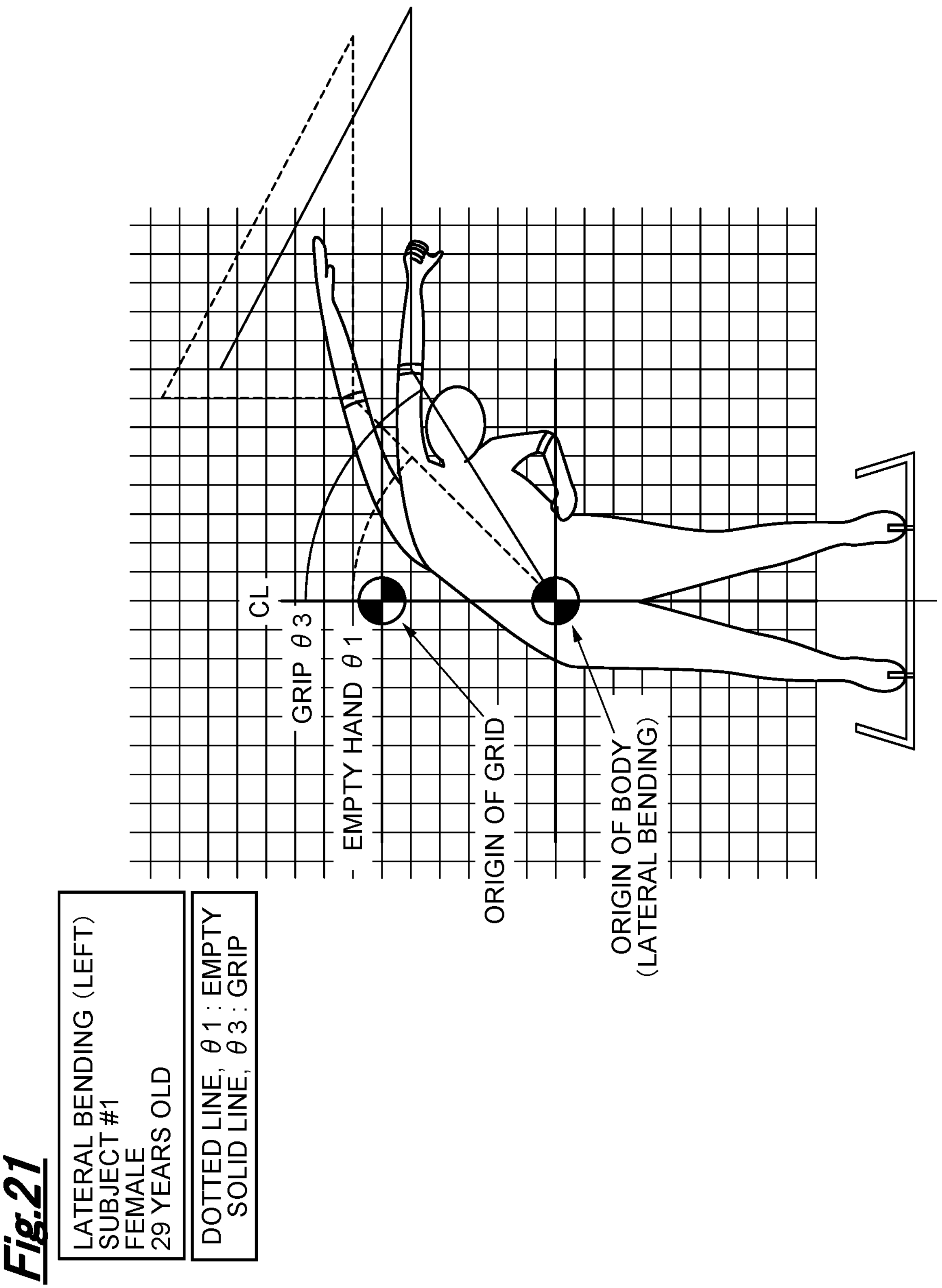
FIG. 21 is a view for explaining the measurement in Example.

Lateral bending is a motion of bending sides of the body. How to do it is to stand on the floor with the body straight and raise a right arm straight up so as to be parallel to the vertical axis center line, and it is a motion of bending only an upper body to the left or right side without moving a lower body as in a lower image. In the present example, the subject bends the side about the vertical axis center line and a lateral bending origin, a tilt angle (θ1) of the trunk during the empty hand, a tilt angle (θ2) of the trunk during the stick grasping, and a tilt angle (θ3) of the trunk during the grip grasping were measured, and differences therebetween were compared. Note that FIG. 21 shows an image when the tilt angle (θ1) of the trunk during the empty hand (dotted line) and the tilt angle (θ3) of the trunk during the grip grasping (solid line) were measured.

(Leg Raising)

Figure 22:
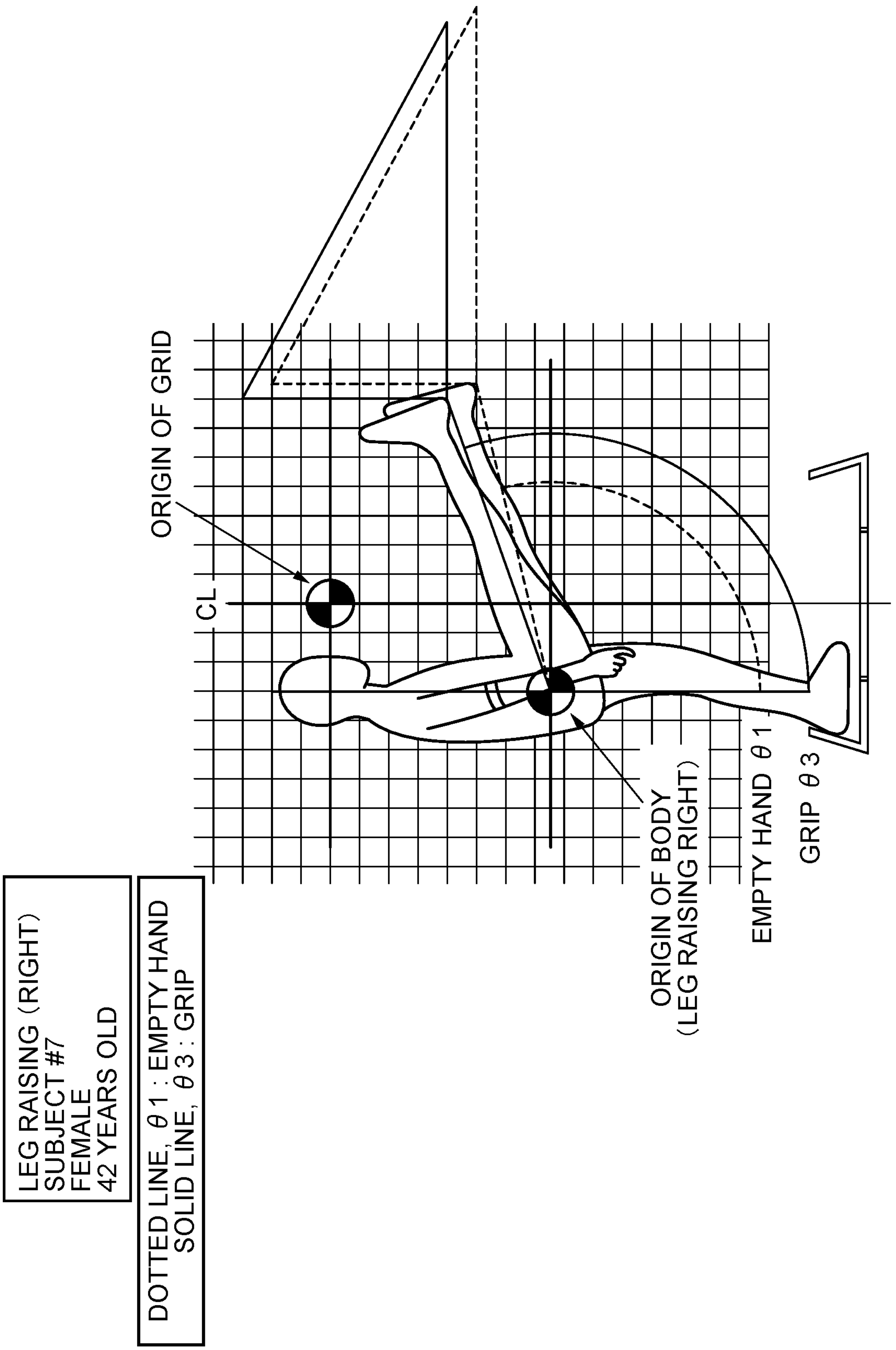
FIG. 22 is a view for explaining the measurement in Example.

The leg raising is a motion of standing up straight with both feet aligned, and swinging a left foot or a right foot forward as in the image without back action. In the present embodiment, a bending angle (θ1) between an axial leg and a swing leg during the empty hand, a bending angle (θ2) between the axial leg and the swing leg during the stick grasping, and a bending angle (θ3) between the axial leg and the swing leg in the grip grasping were measured from a leg raising origin, and differences therebetween were compared. Note that FIG. 22 shows an image when the bending angle (θ1) between the axial leg and the swing leg during the empty hand (dotted line) and the bending angle (θ3) between the axial leg and the swing leg during the grip grasping (solid line) were measured.

(Waist Twisting)

Figure 23:
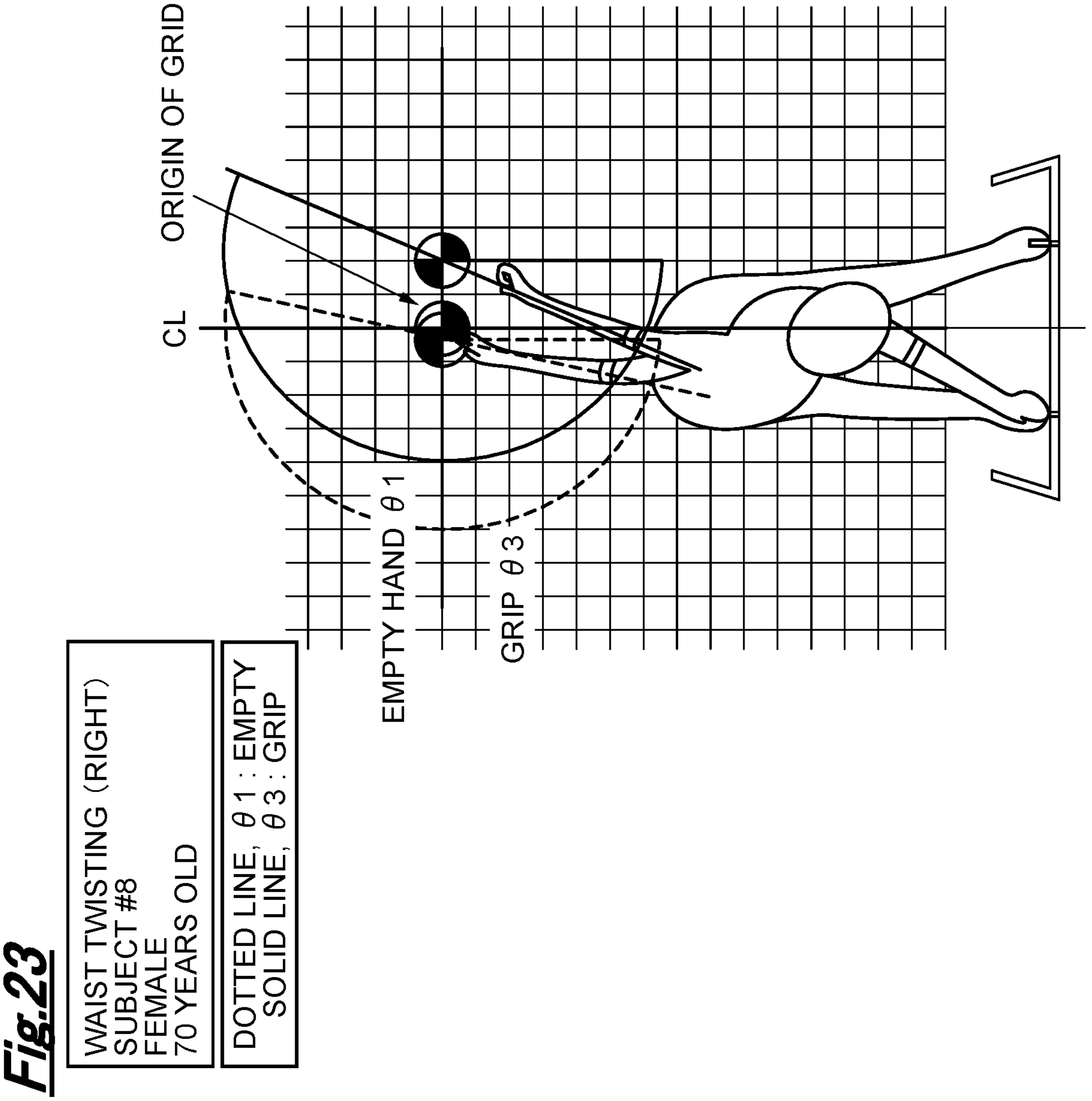
FIG. 23 is a view for explaining the measurement in Example.

The waist twisting is a motion of standing with the body straight, and then bending the body forward to the maximum, keeping the lower body not to move, directing the left hand in a direction of a positioning tape of a shoe of the right foot, stretching the right hand straight down, slowly raising the right hand toward the vertical axis center line at an upper side, and twisting the body only with the upper body. In the present example, centering on an intersection of a vertical line of the vertical axis center line and a line of a twist angle, a twist angle (θ1) during the empty hand, a twist angle (θ2) during the stick grasping, and a twist angle (θ3) during the grip grasping were measured, and differences therebetween were compared. Note that FIG. 23 shows an image when the twist angle (θ1) during the empty hand (dotted line) and the twist angle (θ3) during the grip grasping (solid line) were measured.

(Comparison Results)

For reference, FIGS. 24 to 26 illustrate measurement images of the lateral bending, the leg raising, and the waist twisting. FIG. 24(*a*) is an image of lateral bending left, and FIG. 24(*b*) is an image of lateral bending right. FIG. 25(*a*) is an image of the leg raising left, and FIG. 25(*b*) is an image of the leg raising right. FIG. 26(*a*) is an image of the waist twisting left, and FIG. 26(*b*) is an image of the waist twisting right. Note that FIGS. 24 to 26 illustrate a measurement image of the empty hand in addition to the measurement image of "stick" and the measurement image of "grip (instrument 1)".

(Comparison Between Empty Hand and Instrument (Grip))

FIG. 27 is a diagram showing measurement results of the angle (θ1) with the "empty hand" and the angle (θ3) during the "grip (instrument 1)" grasping measured as described above and differences (Δθ1) therebetween.

As shown in FIG. 27, although there is a difference in degree, in all the subjects 1 to 8, the angle is larger when the grip (instrument 1) is grasped than during the empty hand, and it can be seen that the range of motion of the joint is increased. Although the value of Δθ1 is negative in only the waist twisting right of the subject 7 but the difference is small and does not affect results of this measurement, and it can be said that effects by the grip (instrument 1) of the present invention is obvious.

(Comparison Between Stick and Instrument (Grip))

FIG. 28 is a diagram showing measurement results of the angle (θ2) during the "stick" gripping and the angle (θ3) during the "grip (instrument 1)" grasping measured as described above and differences (Δθ2) therebetween.

As shown in FIG. 28, although there is a difference in degree, in all the subjects 1 to 8, the angle is larger when the grip (instrument 1) is grasped than when the stick is grasped, and it can be seen that the range of motion of the joint is increased.

In addition, when the stick is grasped, the range of motion of the joint is slightly increased as compared with during the empty hand, but a difference in the effect of increasing the range of motion of the joint from when the grip (instrument 1) is grasped is obvious.

This is considered to be because, when the stick is grasped, it seems that the range of motion of the joint is increased due to muscle strength because the force is easily applied, but as will be described later in "Consideration", when the pressure is applied to the Pacinian corpuscle by the grip, the range of motion of the joint is increased due to no muscle pain, and thus operational effects are fundamentally different.

Note that the subject 6 was the first person in the test, and could not perform recording well for the leg raising right. For other subjects, since the recording and the measurement have been performed well, and the effects are also remarkable, lack of data of the subject 6 does not affect the results of this measurement, and it can be said that the effects by the grip (instrument 1) of the present invention is obvious.

(Comparison Between Empty Hand and Stick)

FIG. 29 is a diagram showing measurement results of the angle (θ1) with the "empty hand" and the angle (θ2) during the "stick" grasping measured as described above and differences (404) therebetween.

As shown in FIG. 29, although there is a subject having a larger angle when the stick is grasped as compared with the empty hand, the degree is small, and the difference in the effect of increasing the range of motion of the joint from when the grip (instrument 1) is grasped is obvious.

As described above, this is considered to be because, when the stick is grasped, it seems that the range of motion of the joint is increased due to the muscle strength because the force is easily applied, but as will be described later in "Consideration", when the pressure is applied to the Pacinian corpuscle by the grip, the range of motion of the joint is increased due to no muscle pain, and thus the operational effects are fundamentally different.

Note that for the leg raising right of the subject 6, since the subject 6 was the first person and the images could not be taken, the measurement could not be performed.

(Consideration)

As described above, it has been found that by applying stimulation due to an appropriate pressure with a protrusion having an appropriate shape to an accurate position of the Pacinian corpuscle present in the palm, rigidity of muscles of the whole body is eliminated and muscle relaxation occurs. It has also been found that muscle relaxation increases the flexibility of the whole body, resulting in an increased range of motion of the joint.

In addition, each of the above embodiments is merely an example of implementation in implementing the present invention, and the technical scope of the present invention should not be construed to be limited by this. That is, the present invention can be implemented in various forms without departing from the gist or main features thereof. For example, each configuration of the embodiments may be combined and implemented.

(Means 1)

An instrument for promoting the muscle stretching or for increasing the range of motion of the joint, including a pressing portion capable of pressing a Pacinian corpuscle present in a palm.

(Means 2)

The instrument including a main body portion and the pressing portion provided to protrude from the main body portion, in which by grasping the main body portion with one hand, the pressing portion can contact skin on the Pacinian corpuscle present in the palm to press the Pacinian corpuscle.

(Means 3)

The instrument according to the means 2, in which the pressing portion can be directed toward the Pacinian corpuscle.

(Means 4)

The instrument according to the means 2, in which the pressing portion includes:

a contact portion having a contact surface that contacts the skin on the Pacinian corpuscle when the Pacinian corpuscle is pressed; and a connecting portion that is separated from a palm of a user and connects the main body portion and the contact portion in a state where the main body portion is grasped by the user.

(Means 5)

The instrument according to the means 3, in which the connecting portion is configured such that at least a part of skin surrounding the skin on the Pacinian corpuscle and the instrument are brought into a non-contact state in a state where the skin on the Pacinian corpuscle contact the instrument.

(Means 6)

The instrument according to the means 3 or 4, in which the main body portion includes a first recess for positioning a little finger of the user at a position substantially opposite to a position where the pressing portion is provided, and is configured such that the Pacinian corpuscle is pressed by the pressing portion by grasping the main body portion in a state where the little finger of the user is positioned in the first recess of the main body portion.

(Means 7)

The instrument according to the means 5, in which the main body portion includes a second recess for positioning a ring finger of the user adjacent to the first recess, and is configured such that the Pacinian corpuscle is pressed by the pressing portion by grasping the main body portion in a state where the ring finger of the user is positioned in the second recess of the main body portion.

(Means 8)

The instrument according to any one of the means 2 to 6, in which the main body portion includes a first stopper that is provided to protrude from the main body portion, and contacts the little finger of the user in a state where the main body portion is grasped by the user to position the instrument in the palm of the user.

(Means 9)

The instrument according to any one of the means 2 to 7, in which the main body portion includes a second stopper that is provided to protrude from the main body portion, positioned between an index finger and the middle finger of the user in a state where the main body portion is grasped by the user, and restricts rotation of the instrument in the palm of the user.

(Means 10)

The instrument according to any one of the means 2 to 8, in which the main body portion includes a third stopper that is provided to protrude from the main body portion, and contacts a portion near a base of thumb of the user in a state where the main body portion is grasped by the user to restrict rotation of the instrument in the palm of the user.

(Means 11)

A training method for increasing a range of motion of a joint, the training method including grasping with one hand a main body portion of an instrument including: a main body portion; and a pressing portion that is provided to protrude from the main body portion and presses to stimulate a Pacinian corpuscle present in a palm of a user, so that the pressing portion contacts skin on the Pacinian corpuscle to move the joint in a state where the Pacinian corpuscle is pressed.

(Means 12)

The instrument according to any one of the means 1 to 9, which is for improving motion function or for rehabilitation.

REFERENCE SIGNS LIST

1 instrument
10 main body portion
101 first main body portion
101*a* protrusion
101*b* recess
102 second main body portion
102*a* first protrusion
102*b* second protrusion
102*c* recess
103 third main body portion
103*a* recess
104 fourth main body portion
104*a* recess
11A first stopper (little finger stopper)
11B second stopper (middle finger stopper)
11C third stopper (thumb stopper)
12A first recess
12B second recess
20 pressing portion
20*a* protrusion
21 contact portion (Pacinian ball)
21A contact surface
22 connecting portion

The invention claimed is:

1. An instrument capable of being grasped with one hand, wherein the instrument comprises a pressing portion capable of pressing a Pacinian corpuscle present in a palm when the instrument is grasped with one hand.

2. The instrument according to claim 1, comprising a main body portion and the pressing portion provided to protrude from the main body portion, wherein by grasping the main body portion with one hand, the pressing portion is capable of contacting skin on the Pacinian corpuscle present in the palm to press the Pacinian corpuscle.

3. The instrument according to claim 2, wherein the pressing portion comprises:

a contact portion having a contact surface that contacts the skin on the Pacinian corpuscle when the Pacinian corpuscle is pressed; and a connecting portion that is separated from a palm of a user and connects the main body portion and the contact portion in a state where the main body portion is grasped by the user.

4. The instrument according to claim 3, wherein the connecting portion is configured such that at least a part of skin surrounding the skin on the Pacinian corpuscle and the instrument are brought into a non-contact state in a state where the skin on the Pacinian corpuscle contacts the instrument.

5. The instrument according to claim 4, wherein the main body portion comprises a second recess for positioning a ring finger of the user adjacent to the first recess, and is configured such that the Pacinian corpuscle is pressed by the pressing portion by grasping the main body portion in a state where the ring finger of the user is positioned in the second recess of the main body portion.

6. The instrument according to claim 2, wherein the main body portion comprises a first stopper that is provided to protrude from the main body portion, and contacts the little finger of the user in a state where the main body portion is grasped by the user to position the instrument in the palm of the user.

7. The instrument according to claim 2, wherein the main body portion comprises a second stopper that is provided to protrude from the main body portion, positioned between an index finger and the middle finger of the user in a state where the main body portion is grasped by the user, and restricts rotation of the instrument in the palm of the user.

8. The instrument according to claim 2, wherein the main body portion comprises a third stopper that is provided to protrude from the main body portion, and contacts a portion near a base of thumb of the user in a state where the main body portion is grasped by the user to restrict rotation of the instrument in the palm of the user.

9. The instrument according to claim 1, wherein the pressing portion is configured to concentrate pressure on the Pacinian corpuscle.

10. The instrument according to claim 9, wherein the main body portion comprises a first recess for positioning a little finger of the user at a position opposite to a position where the pressing portion is provided, and is configured such that the Pacinian corpuscle is pressed by the pressing portion by grasping the main body portion in a state where the little finger of the user is positioned in the first recess of the main body portion.

11. The instrument according to claim 1, wherein the Pacinian corpuscle is configured to be able to be pressed by a force of a little finger.

12. A training method for promoting muscle stretching or for increasing a range of motion of a joint, comprising using an instrument according to claim 1.

13. A training method for improving motion function or for rehabilitation, comprising using an instrument according to claim 1.

* * * * *